US012772112B2

(12) United States Patent
Vaez-Ghaemi et al.

(10) Patent No.: US 12,772,112 B2
(45) Date of Patent: Oct. 20, 2026

(54) REAL-TIME O-RAN FRONTHAUL ANALYZER

(71) Applicant: VIAVI SOLUTIONS INC., Chandler, AZ (US)

(72) Inventors: Reza Vaez-Ghaemi, Potomac, MD (US); Wei Chen, Potomac, MD (US); Kenneth Trudgeon, Victoria (CA); David Fenstermacher, Mount Airy, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 433 days.

(21) Appl. No.: 18/475,116

(22) Filed: Sep. 26, 2023

(65) Prior Publication Data

US 2025/0106691 A1 Mar. 27, 2025

(51) Int. Cl.
*H04W 28/18* (2009.01)
*H04W 28/086* (2023.01)

(52) U.S. Cl.
CPC ....... *H04W 28/18* (2013.01); *H04W 28/0861* (2023.05)

(58) Field of Classification Search
CPC .. H04W 28/18; H04W 28/0861; H04W 24/08
See application file for complete search history.

(56) References Cited

U.S. PATENT DOCUMENTS 7,701,863 B2 4/2010 Charcranoon
11,751,064 B1 9/2023 Montalvo
11,784,883 B2 10/2023 Kim et al.
11,843,953 B1 12/2023 Montalvo
11,889,508 B1 1/2024 Anderson et al.
2006/0271823 A1* 11/2006 Smith ..................... H04L 43/18 714/37
2022/0158926 A1 5/2022 Wennerstrom et al.
(Continued)

FOREIGN PATENT DOCUMENTS

CN 113114404 A 7/2021
EP 4301027 A1 1/2024

OTHER PUBLICATIONS

European Patent Office, "The extended European search report for EP Application No. 24201191.4", dated Feb. 27, 2025, 12 pages.
(Continued)

*Primary Examiner* — Nizam U Ahmed
(74) *Attorney, Agent, or Firm* — Mannava & Kang, P.C.

(57) ABSTRACT

Apparatuses and methods for implementing a real-time Open Radio Access Network (O-RAN) fronthaul analyzer are provided. In one example, a hardware accelerator may receive and timestamp packets in an O-RAN fronthaul packet traffic flow, parse and route the time-stamped packets on different circuit paths to one or more hardware packet analyzers, where the one or more hardware packet analyzers generate analytical timing measurements in real-time using the timestamps on the plural packets. In some examples, the hardware accelerator may include a flow tracker to track packet flows and a parser to parse metadata from packet headers and route individual packets onto appropriate circuit paths. In some examples, the real-time O-RAN fronthaul analyzer may be used for testing an O-RAN fronthaul link for compliance with O-RAN standards.

19 Claims, 10 Drawing Sheets

(56) References Cited

U.S. PATENT DOCUMENTS

| | | | |
|---|---|---|---|
| 2023/0046743 A1 | 2/2023 | Vaez-Ghaemi et al. | |
| 2023/0319610 A1 | 10/2023 | Kasagi et al. | |
| 2023/0362807 A1 | 11/2023 | Kodaypak et al. | |
| 2023/0397031 A1 | 12/2023 | Mehta et al. | |
| 2024/0049046 A1 | 2/2024 | Kodaypak et al. | |
| 2024/0154857 A1 | 5/2024 | Ogihara et al. | |
| 2024/0179577 A1 * | 5/2024 | Porras | H04W 28/24 |

OTHER PUBLICATIONS

European Patent Office, "The extended European search report for EP Application No. 24201192.2", dated Mar. 11, 2025, 13 pages.
O-RAN Fronthaul Working Group, "Fronthaul Interoperability Test Specification (IOT); O-RAN.WG4.IOT.0-R003-v06.01", O_RAN Technical Specification, O-RAN Fronthaul Working Group, Mar. 1, 2022, pp. 1-125.
2023 5G Challenge Stage Two—RU Test Plan, Mar. 21, 2023, Version: 1.3, CableLabs, 46 pages.
5G; NR; Physical channels and modulation (3GPP TS 38.211 version 15.4.0 Release 15); ETSI TS 138 211 V15.4.0 Apr. 2019, 98 pages.
Abdalla, et al.; Toward Next Generation Open Radio Access Networks—What O-RAN Can and Cannot Do!; IEEE Network Magazine; Mar. 26, 2022; 8 pages.
Accuver, AEGIS-O, O-RAN End-to-End Test & Measurement Platform, 1 page, downloaded from the Internet on Sep. 26, 2023. (https://www.accuver.com/sub/products/view.php?idx=45).
ECPRI Specification V2.0, Common Public Radio Interface: eCPRI Interface Specification, May 10, 2015, 109 pages.
O-RAN Alliance Working Group 5 O1 Interface specification for O-DU; O-RAN.WG5.O-DU-O1.0-R003-v07.00; Jun. 2023, 143 pages.
O-RAN Fronthaul Working Group Fronthaul Interoperability Test Specification (IOT); O-RAN.WG4.IOT.0-R003-v10.00; Oct. 2022, 128 pages.
O-RAN Intel® FPGA IP Design Example User Guide; Updated for Intel® Quartus® Prime Design Suite: 23.1; IP Version: 1.9.1; Aug. 15, 2023; pp. 32.
O-RAN Intel® FPGA IP User Guide; Updated for Intel® Quartus® Prime Design Suite: 23.1; IP Version: 1.9.1; Aug. 15, 2023; 54 pages.
O-RAN Open Xhaul Transport WG9 WDM-based Fronthaul Transport; O-RAN.WG9.WDM.0-R003-v03.00; Mar. 2023, 60 pages.
O-RAN Test and Integration Focus Group End-to-end Test Specification; O-RAN.TIFG.E2E-Test.0-v04.00; Oct. 2022, 227 pages.
O-RAN Work Group 1 (Use Cases and Overall Architecture) Use Cases Detailed Specification; O-RAN.WG1.Use-Cases-Detailed-Specification-R003-v11.00; Jun. 2023, 189 pages.
O-RAN Working Group 1 (Use Cases and Overall Architecture) O-RAN Architecture Description; O-RAN.WG1.OAD-R003-v09.00; Jun. 2023, 41 pages.
O-RAN Working Group 4 (Open Fronthaul Interfaces WG) Control, User and Synchronization Plane Specification; O-RAN.WG4.CUS.0-R003-v12.00; Jun. 2023, 395 pages.
O-RAN Working Group 4 (Open Fronthaul Interfaces WG) Management Plane Specification; O-RAN.WG4.MP.0-R003-v12.00; Jun. 2023, 283 pages.
Polese, et al.; Understanding O-RAN: Architecture, Interfaces, Algorithms, Security, and Research Challenges; Aug. 1, 2022; 33 pages.
Publicly Available Specification (PAS); O-RAN Fronthaul Control, User and Synchronization Plane Specification v07.02; (O-RAN-WG4.CUS.0-v07.02); ETSI TS 103 859 V7.0.2; Sep. 2022; 318 pages.
The Evolution of Open Ran; A 5G Americas White Paper; Feb. 2023; 50 pages.
Umesh, et al.; Overview of O-RAN Fronthaul Specifications; NTT Docomo Technical Journal vol. 21 No.1; Jul. 2019; 14 pages.
Viavi Solutions; Open Fronthaul Test Applications with T-BERD/MTS-5800; Sep. 2021, 5 pages.
Viavi Solutions; Test Suite for O-RAN Specifications; Updated for 2021 to include learnings from 2020 plugfest; 2021, 14 pages.
Xena, "Test the Resiliency of your 5G RAN Fronthaul Solution"; GSMA | The Mobile Economy—The Mobile Economy; Mar. 2023, 4 pages.

* cited by examiner

REAL-TIME O-RAN FRONTHAUL ANALYZER

TECHNICAL FIELD

This patent application is directed to a fronthaul analyzer, and more specifically, to a real-time fronthaul analyzer of the packet traffic flow on an Open Radio Access Network (O-RAN) fronthaul link between an O-RAN-Distributed Unit (O-DU) and an O-RAN-Radio Unit (O-RU).

BACKGROUND

Presently, cellular telephony technology is developing and adopting the Open Radio Access Network (O-RAN) standards, which may provide interoperability that may enable multiple cellular network/communication protocols/types and the products of multiple vendors to work together in the same network. O-RAN standards focus on openness (open source software, hardware interoperability/open interfaces, flexible deployment in a disaggregated multi-vendor/multi-tech architecture), intelligence (incorporating artificial intelligence (AI) into the deployment, operation, and maintenance of the network and using software-defined implementations of wireless communications and networking functions), and virtualization (in order to decouple legacy entities and layers, thereby enabling the interoperability, flexibility, disaggregation, and heterogeneity of the O-RAN environment).

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
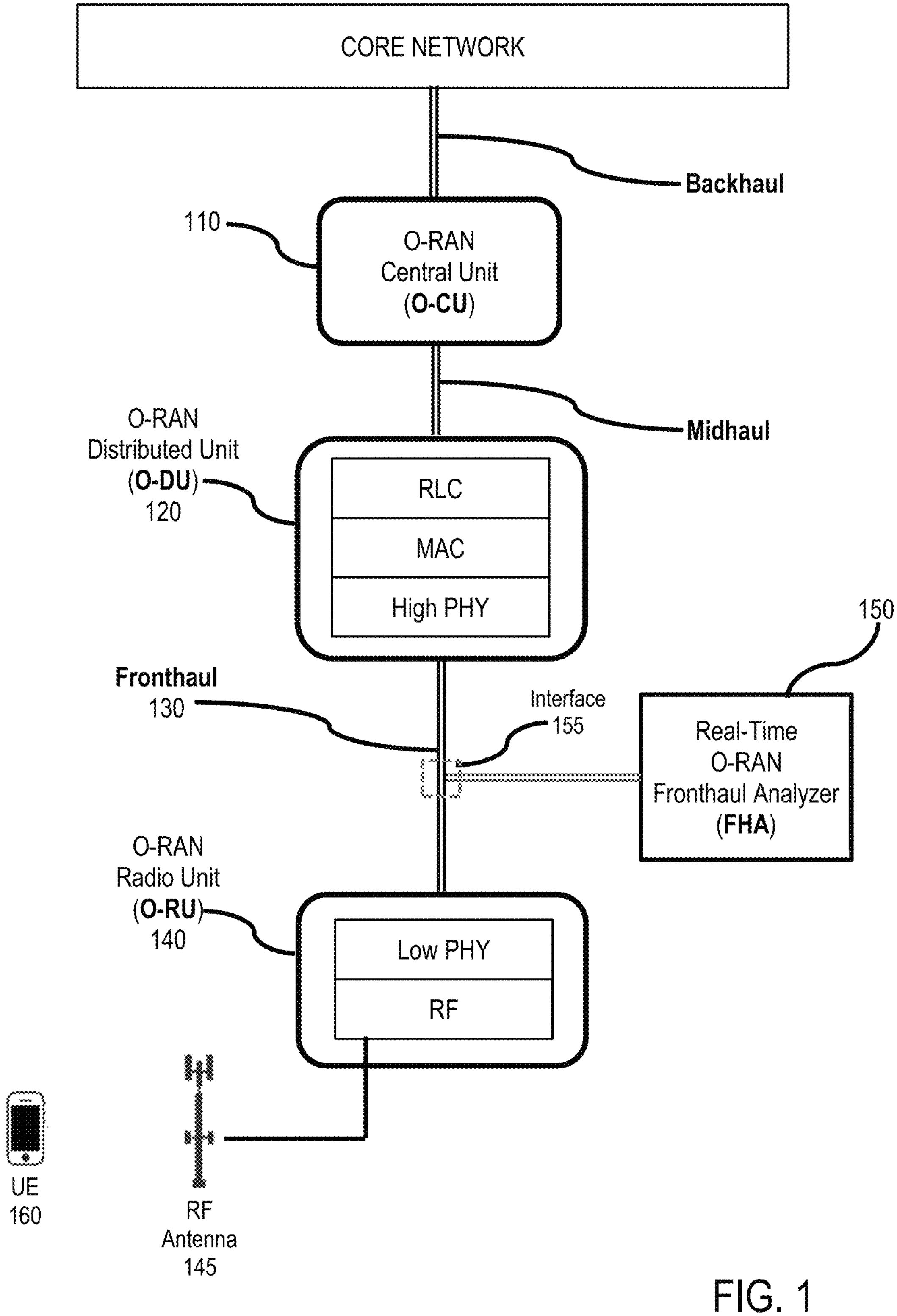
FIG. 1 is a block diagram illustrating relevant units/components of an Open Radio Access Network (O-RAN) fronthaul (FH) link which may be tested/analyzed by a real-time O-RAN Fronthaul Analyzer (FHA), according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Analyzers/testers may be used to test, analyze, and evaluate both the hardware and the software of the components operating in a cellular communication network that implements the O-RAN standards. In examples of the present disclosure, a real-time O-RAN fronthaul (FH) analyzer (FHA) provides real-time hardware analysis, processing, and measurement and/or real-time continuous generation of analysis, measurements, statistics, etc., of an O-RAN FH link between at least one O-RAN Distributed Unit (O-DU) and at least one O-RAN Radio Unit (O-RU). As used herein in reference to an O-RAN FHA according to examples of the present disclosure, the terms "real-time" or "in real time" refer to an O-RAN FHA according to examples of the present disclosure performing the processing, functions, and/or actions within roughly a nanosecond of receipt at the O-RAN FHA of the frame and/or packet upon which the processing, functions, and/or actions performed, e.g., from about 0.5 nanosecond to about 1.5 milliseconds after receipt.

Some advantages and benefits of the systems and methods for a real-time O-RAN FHA according to examples of the present disclosure are described, while other benefits and advantages may also be apparent to anyone of ordinary skill in the art. For instance, a real-time O-RAN FHA according to examples of the present disclosure may provide real-time analysis, processing, and measurement of the O-RAN fronthaul link in hardware, rather than (and/or in addition to) post-processing in software of captured packets/frames from the O-RAN fronthaul link. In some examples of a real-time O-RAN FHA according to the present disclosure, low-level analysis such as counting packets, reading metadata, tracking active packet flows, making timing measurements, etc., may be performed in hardware rather than software. In some examples, a real-time O-RAN FHA according to the present disclosure may process substantially all packets received over the O-RAN fronthaul link, meaning that almost no packets are dropped. Accordingly, a user may perform "live" analysis in real-time on a running O-RAN fronthaul link. In some examples, a user of a real-time O-RAN FHA according to the present disclosure may simultaneously view live data from several sources in addition to the real-time O-RAN FHA (such as, e.g., an O-RU counter, an O-DU counter, a User Equipment (UE) emulator, etc.), allowing the user to more easily correlate events and/or data.

In examples of a real-time O-RAN FHA according to the present disclosure, packet analysis may be performed/implemented in parallel in hardware, rather than serially in post-processing by software reading and accessing captured frames/packets. Accordingly, packet analysis may be faster. In examples of a real-time O-RAN FHA according to the present disclosure, low level analysis of packet traffic flow over the O-RAN fronthaul link may be performed/implemented in hardware for continuous real-time processing, rather than (and/or in addition to) being performed by after-the-fact post-processing in software of captured packets/frames from the O-RAN fronthaul link. Accordingly, when a user performs live analysis in real-time on a running O-RAN fronthaul link, the live analysis may be continuously generated and/or updated in real-time as environmental/system changes occur.

FIG. 1 is a block diagram illustrating relevant units/components of an Open Radio Access Network (O-RAN) fronthaul (FH) link being tested/analyzed by a real-time O-RAN Fronthaul Analyzer (FHA), according to an example. Only the units/components of an O-RAN most relevant to the explanation and description of a real-time fronthaul analyzer according to the examples of the present disclosure are shown and discussed herein. Moreover, less relevant components/units shown and described may not be numbered.

In FIG. 1, a core network is connected by a backhaul link to an O-RAN Central Unit (O-CU) 110, which, in turn, is connected by a midhaul link to an O-RAN Distributed Unit (O-DU) 120, which, in turn, is connected by an O-RAN fronthaul (FH) link 130 to an O-RAN Radio Unit (O-RU) 140 which may include a radiofrequency (RF) antenna 145. A user equipment (UE) 160 communicates via radio interface with the RF antenna 145 of the O-RU 140.

In the design of the O-RAN architecture, which is in harmony with the 5G New Radio (NR) RAN architecture defined by the 3GPP, the O-CU 110, the O-DU 120, and the O-RU 140 may be responsible for delivering the diverse functions of the radio protocol stack associated with the Radio Resource Control (RRC), Service Data Adaption Protocol (SDAP), Packet Data Convergence Protocol (PDCP), Radio Link Protocol (RLC), and the Medium Access Control (MAC) and physical (PHY) layers.

The O-RU 140 may integrate antenna elements with radio processing components, such as transceivers, analog beamformers, and power amplifiers, by which the O-RU 140 may use its RF antenna 145 to establish a PHY layer connection with the UE 160. In addition to the RF processing, the O-RU 140 integrates the lower level PHY layer processing (Low PHY), such as digital and/or analog beamforming, the fast Fourier transform (FFT)/inverse-FFT (i-FFT) processing, Cyclic Prefix (CP) addition, Digital-Analog Conversion, IQ Compression/Decompression, etc. The O-RU 140 communicates with the O-DU 120 over the O-RAN FH link 130.

As would be understood by one of ordinary skill in the art, although labelled a "link" herein, the O-RAN FH link 130 may take any number of forms, including a network or a cloud. Moreover, the O-RAN FH link 130 may use Ethernet as a transport mechanism (i.e., the Institute of Electrical and Electronic Engineers (IEEE) Standard 802.3 (IEEE 802.3)), as it does in the present disclosure, but the O-RAN FH link 130 may also use the Internet Protocol (IP), the Internet Engineering Task Force (IETF) Request for Comments (RFCs) 791 & 2460, and the User Datagram Protocol (UDP), IETF RFC 768, in addition to Ethernet, or in place thereof. When using Ethernet, the payload of the Ethernet frame may contain a further transport header and payload, which encapsulation may be indicated in the EtherType field of the Ethernet frame header. O-RAN allows for multiple different headers within the Ethernet payload to further describe how the data may be handled, including the evolved Common Public Radio Interface (eCPRI) transport header. For further details, see, e.g., Sect. 5 of the Control, User, and Synchronization Plane Specification of O-RAN Working Group 4 (O-RAN.WG4.CUS.0-R003-v12.00), which is hereby incorporated herein in its entirety (hereinafter referred to as "the O-RAN FH C/U/S-Plane standard").

As would be understood by one of ordinary skill in the art, although FIG. 1 shows a single O-DU connected to a single O-RU, a single O-DU may be connected to multiple O-RUs (either in parallel or in cascade mode), or multiple O-DUs may be connected to multiple O-RUs. See, e.g., Sect. 2.1.1 of the Fronthaul Interoperability Test Specification of O-RAN Working Group 4 (O-RAN.WG4.IoT.0-R003-v10.00), which is hereby incorporated herein in its entirety (hereinafter referred to as "the O-RAN FH IoT standard"). Moreover, the O-RAN FH link 130 may include a Fronthaul Transport Node (FTN) or Transport Node Element (TNE), which may be used to manage the Ethernet communications between one or more O-DUs and one or more O-RUs, a Fronthaul Multiplexer (FHM), whereby a single O-DU may connect with a cell having multiple O-RUs, or with multiple cells each having multiple O-RUs, or a Fronthaul Gateway (FHGW or FHG), whereby one or more O-DUs may connect with a non-O-RAN RU (such as, e.g., a Remote Radio Unit (RRU), a Remote Radio Head (RRH), etc.). See, e.g., Annex A of the O-RAN Architecture Description of O-RAN Working Group 1 (O-RAN.WG1.OAD.R003-v09.00), which is hereby incorporated herein in its entirety.

Referring to FIG. 1, the O-DU 120 is connected to the O-RU 140 via the O-RAN FH link 130, and may be responsible for the higher level processing functions of the PHY layer (High Phy), such as, e.g., channel modulation and coding/decoding, the MAC layer, and the RLC layer. The O-DU 120 is connected via the midhaul link to the O-CU 110, which may be responsible for the upper layers of the radio protocol: the RRC, the PDCP, and the SDAP. The O-CU 110 may be supported by the Network Function Virtualization Infrastructure (NFVI) of the core network, which may enable simultaneous operation with both Long-Term Evolution (LTE)O-DUs and 5G NR O-DUs.

As shown in FIG. 1, the real-time O-RAN Fronthaul Analyzer (FHA) 150 may be detachably or permanently connected to the O-RAN FH link 130 by interface 155. The interface 155 may be an inline connection and/or may take the form of a splitter, a tap, and/or any appropriate plug for such a connection, as would be understood by one of ordinary skill in the art. Moreover, as discussed in greater detail below, in various examples of the present disclosure, the real-time O-RAN FHA 150 may have an intrusive mode, where some or all of the communication traffic on the O-RAN FH link 130 flows through some or all of the analytical components of the real-time O-RAN FHA 150, and a non-intrusive mode, where the real-time O-RAN FHA 150 makes copies of traffic packets to analyze in real time, and the real-time O-RAN FHA 150 may be either connected to the O-RAN FH link 130 by a tap or equivalent interconnection, or the real-time O-RAN FHA 150 allows some or all of the traffic to flow through a direct channel in the real-time O-RAN FHA 150. In some examples, the real-time O-RAN FHA 150 may provide bidirectional Synchronous Ethernet (SyncE) clock recovery, which may avoid any break/interrupt of the SyncE line frequency from, e.g., the O-DU 120 to the O-RU 140 (in network configuration LLS-C1), which may be beneficial when in either intrusive mode.

The details of the packet traffic flow of the O-RAN FH link 130, which the real-time O-RAN FHA 150, according to examples of the present disclosure analyzes, evaluates, and/or otherwise synthesizes/processes, are discussed below in reference to FIGS. 2A and 2B. As used herein, "packet traffic flow" may include any packets and/or frames transmitted and/or received over an O-RAN fronthaul link, as defined by the O-RAN standards, i.e., any and all communication carried on an O-RAN fronthaul link. As used herein, a "packet flow" may refer to a multitude of packets that are related by at least one characteristic, which may be identifiable from metadata in the packet headers of the multitude of packets, where such characteristics may include, for example, a source and/or destination (e.g., the O-DU 120, the O-RU 140, the antenna 145, the UE 160, the O-CU 110, the core network, etc., indicated by any form/type of identifying indicia, e.g., a MAC address (including, e.g., an Ethernet MAC address), an IP address, a Virtual Local Area Network (VLAN) tag, an extended Antenna-Carrier identification (eAxC ID), etc.), a communication plane (e.g., U-plane, C-Plane, S-Plane, and/or M-Plane), a traffic direction (e.g., downlink or uplink), a type of packet and/or frame (either generally, e.g., Ethernet, CPRI, IP/UDP, etc., or more specifically, for example, within a specific protocol, e.g., an EtherType, a type of IP/UDP packet, a type of Precision Timing Protocol (PTP) packet, etc.), a protocol-defined relationship (e.g., a PTP master and slave), a timing parameter (as defined by a user and/or a protocol/standard such as O-RAN, such as, e.g., early, late, or on-time packets as described in reference to FIGS. 2C and 2D below—this information may be derived from more than packet header metadata, such as timing information added to each packet), any other characteristic defined, discussed, or suggested herein, etc., as would be understood by one of ordinary skill in the art. As used herein, an "active packet flow" may refer to a packet flow which currently has packets being carried on the O-RAN fronthaul link, even if such packet traffic is intermittent, such as PTP packets in a PTP packet flow, as would be understood by one of ordinary skill in the art.

Figure 2A:
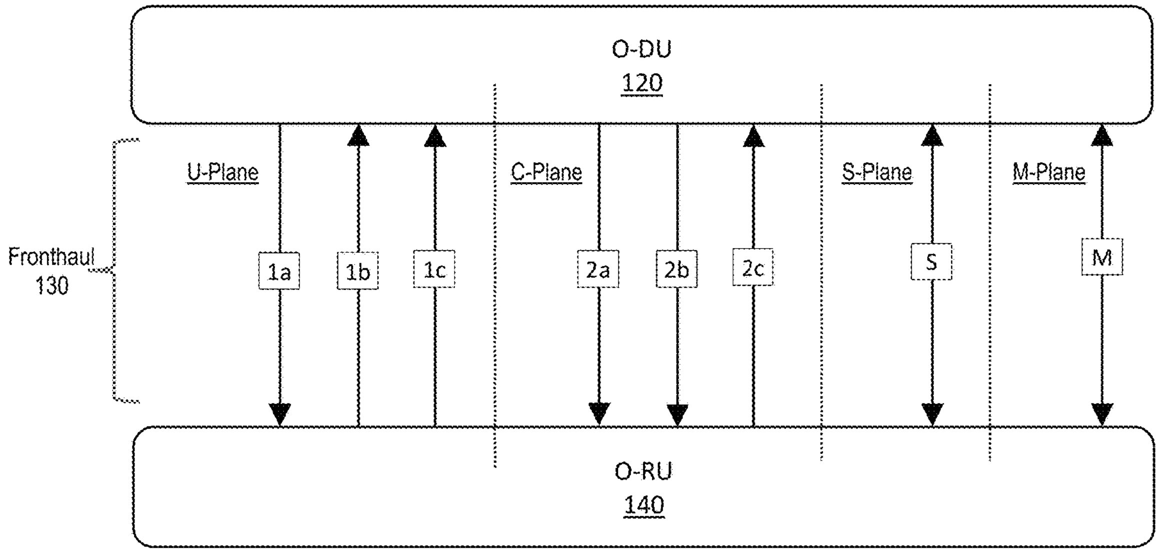
FIG. 2A is a block diagram illustrating the U-, C-, S-, and M-Plane communications of the O-RAN fronthaul (FH) link between the O-DU and O-RU which may be tested/analyzed by a real-time O-RAN FHA, according to an example.

FIG. 2A is a block diagram illustrating the U-, C-, S-, and M-Plane communications between the O-DU 120 and O-RU 140 being tested/analyzed by a real-time Fronthaul Analyzer 150, according to an example. The User Plane (U-Plane) may carry real-time uplink and downlink I/Q data transferred over eCPRI (evolved Common Public Radio Interface), while the Control Plane may carry real-time control information to the O-RU 140 over eCPRI to define how the U-Plane traffic should be handled. See, e.g., the O-RAN FH C/U/S-Plane standard. Because of this, some C-Plane packets should arrive before U-Plane packets and, in the O-RAN standard, these timing tolerances may be relatively tight. See, e.g., the O-RAN FH C/U/S-Plane standard. The O-RAN fronthaul C-Plane is separate and distinct from the C-Plane related to UE over-the-air communications and is governed by entirely different and far more stringent requirements, such as, e.g., strict timing parameters and windows for reception and transmission. See, e.g., the O-RAN FH C/U/S-Plane standard. Because of the interconnectedness of the C-Plane and the U-Plane, they may be referred to jointly as the "C/U-Plane" or "C/U Plane" and may be considered as a single communication plane including two interconnected planes.

The S-Plane and the M-Plane are so-called "slow protocols," carrying less packet traffic than the C/U-Plane. The S-Plane periodically sends timing and synchronization messages using the Precision Timing Protocol (PTP) to synchronize the O-RU 140 to the rest of the network. See, e.g., the O-RAN FH C/U/S-Plane standard; and PTP (IEEE 1588), which is hereby incorporated by reference in its entirety. The M-Plane contains non-real-time traffic (which, as such, has no especially strict timing parameters), carrying non-real-time management and configuration Network Configuration Protocol (NETCONF) and Yet Another Generation (YANG) (NETCONF/YANG)-based operations. See, e.g., Management Plane Specification of O-RAN Working Group 4 (O-RAN.WG4.MP.0-R003-v12.00), which is hereby incorporated herein in its entirety (hereinafter referred to as "the O-RAN FH M-Plane standard"); IETF RFC 5277, IETF RFC 6241, IETF RFC 6242, IETF RFC 6470, IETF RFC 8071, IETF RFC 7951, and IETF RFC 8639, all of which are hereby incorporated by reference in their entireties.

Although typically contained/encapsulated in Ethernet frames, as mentioned above, the C/U/S/M-Plane packets may have their own typically used protocols. The C/U-Plane packets may use eCPRI/Radio over Ethernet (RoE) headers/messages/protocols; the S-Plane may use PTP; and the M-Plane may use NETCONF/YANG headers/messages/protocols.

As shown in FIG. 2A, each one of the C/U Planes may have individually defined traffic flows. The U-Plane may have traffic flow 1*a*, Downlink (DL) Frequency Domain IQ Data, containing DL user data (e.g., user data (PDSCH), control channel data (PDCCH), etc.); traffic flow 1*b*, Uplink (UL) Frequency Domain IQ Data, containing UL user data (e.g., user data (PUSCH), control channel data (PUCCH), etc.); and traffic flow 1*c*, Physical Random Access Channel (PRACH) Frequency Domain IQ Data. The C-Plane may have traffic flow 2*a*, DL & UL Scheduling Commands & Beamforming Commands, containing scheduling information, FFT size, CP length, subcarrier spacing, UL PRACH scheduling, beam index, etc.; traffic flow 2*b*, License Assisted Access (LAA) Listen Before Talk (LBT) configuration parameters and requests, containing LBT configuration parameters (e.g., IbtHandle, IbtDeferFactor, IbtOffset, etc.); and traffic flow 2*c*, LAA LBT status and responses, containing LBT DL indication parameters (e.g., InitialPartialSFs, bufferError, IbtCWR_Result, etc.). As indicated above, the S-Plane may have traffic flow S, Timing & Synchronization, comprising PTP (IEEE 1588), and SYNChronous Ethernet (SyncE) Synchronization Status Message (SSM) traffic and packets. For more details, see, e.g., the O-RAN FH C/U/S-Plane standard. As also indicated above, the M-Plane may have traffic flow M, non-real-time management and configuration information, which may have NETCONF/YANG headers, messages, packets, and information, which may, in turn, be carried using the IP/TCP stack layers. For more details, see, e.g., the O-RAN FH M-Plane standard.

As would be understood by one of ordinary skill in the art, the O-RAN standard is continually evolving and changing, and examples of the present disclosure are intended to apply equally to such evolution and changes. For example, in a revision of the O-RAN FH C/U/S-Plane standard presently under consideration, three additional streams are added to the C-Plane in FIG. 2A, i.e., 2*d* for UE channel information, 2*e* for ACK/NACK messaging, and 2*f* for Wake-up Ready Indication messaging upon wake up. As indicated here and elsewhere, examples of the present disclosure are contemplated to expressly include such evolutionary growth and changes, and thus any new and/or changed parameter, measurement, quantity, and/or quality discussed, described, and/or identified in any changes to the O-RAN and/or related standards.

Figure 2B:
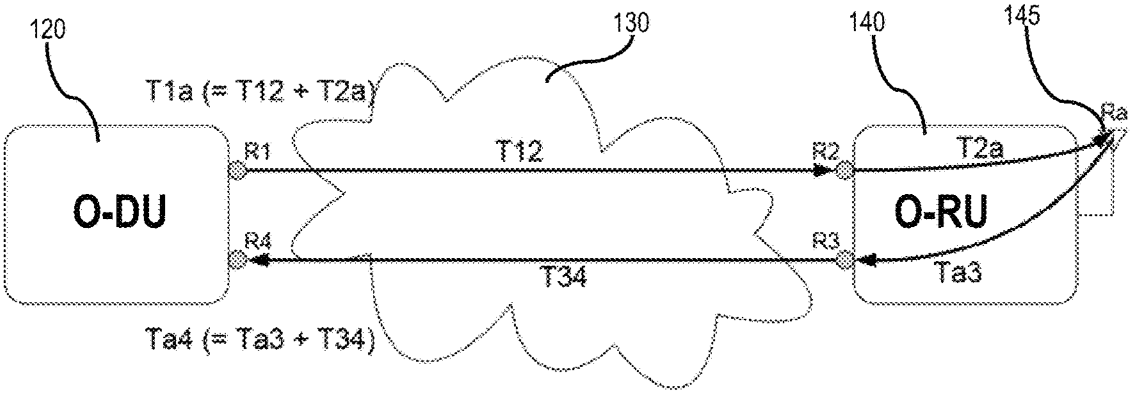
FIG. 2B is a block diagram illustrating the major timing parameters of the O-RAN FH link between the O-DU and O-RU which may be tested/analyzed by a real-time O-RAN FHA, according to an example.

FIG. 2B is a block diagram illustrating the major timing parameters of the O-RAN fronthaul link between the O-DU 120 and O-RU 140, which may be tested/analyzed by a real-time FHA, according to an example. For the most part, these timing parameters may refer to the traffic flow on the C/U-Plane. FIG. 2B shows an O-DU 120 and an O-RU 140 connected by a O-RAN fronthaul link, with several reference points for indicating the timing parameters: R1 and R2 on the DL from O-DU 120 to the O-RU 140, where R1 is located at the O-DU 120 and R2 is located at the O-RU 140; R3 and R4 on the UL from O-RU 140 to the O-DU 120, where R3 is located at the O-RU 140 and R4 is located at the O-DU 120; and Ra, located at the physical RF antenna. Most timing parameters may be identified with reference to these reference points, or to the letters and/or numerals of these reference points. For example, the DL delay may be T12, the UL delay may be T34, with further qualifications such as, e.g., T12 min and T12max indicating the minimum and maximum DL delays. As other examples, T1a may indicate the delay from the O-DU DL output (R1) to transmission over the air (Ra); T2a may indicate the delay from the O-RU DL input (R2) to transmission over the air (Ra); T3a may indicate the delay from (receiving) the transmission over the air (Ra) to the O-RU UL output port (R3); and T4a may indicate the delay from (receiving) the transmission over the air (Ra) to the O-DU UL input port (R4). For more details, see, e.g., the O-RAN FH C/U/S-Plane standard.

It should be noted that FIG. 2B may be considered an approximation/simplification: as noted in Sect. 4.7.1 of the O-RAN FH C/U/S-Plane standard, the latency model of FIG. 2B assumes the antenna-to-O-RU delay is negligible compared to the internal delay of the O-RU 140; however, T2a and Ta3 may be defined differently than as shown in FIG. 2B when the O-RU 140 external antenna 145 delay(s) are also introduced. More specifically, two additional points, Rd and Ru (not shown in FIG. 2B), are defined as located on the O-RU 140 at the output to and input from, respectively, the antenna 145, thereby defining times Tda from Rd to Ra and Tau from Ra to Ru. T2a and Ta3 remain, but only define the internal delays of the O-RU 140, from R2 to Rd and from Ru to R3, respectively. Accordingly, when such delays are also considered, the overall DL delay T1a=T12+T2a+Tda and the overall uplink delay Ta4=Tau+Ta3+T34 (by contrast to FIG. 2B). See details regarding the external antenna 145 timing delays in, e.g., FIGS. 4.7-1, Table 4.7.1-1, and the related discussion in the O-RAN FH C/U/S-Plane standard. As would be understood by one of ordinary skill in the art, calculations, measurements, and analyses may need to be adjusted if such external antenna delays are to be considered.

The relationships between the timing parameters on the O-RAN FH link 130 may be particularly stringent, and in some cases may be more important/relevant for the proper operation of the O-RAN FH link 130 than any of the individual parameters themselves. For example, it may be more important that packets in the traffic flow arrive within a particular reception window and transmit within a particular transmission window than whether individual packets arrive and/or depart at specific times. Moreover, because of new complexities and complications in developing 5G/6G cellular communication, such as, e.g., numerology, where the size and shape of any particular symbol may be different among the packet flows, and the use of Multiple Input Multiple Output (MIMO) and beamforming, both the necessity of keeping to precise transmission/reception windows may be more important and the ability to measure the important timing and other parameters may be more difficult.

More specifically, and as an example, it takes some amount of time for the sender to transmit the packets in either direction (DL/UL) over the transmission media. However, the amount of data for any interval (e.g., symbol) can vary thus resulting in differing transmit times. This transmission time can be affected by several factors including (but not limited to) transport media rate, air interface bandwidth, and amount of data compression. The maximum amount of time allowed for the transmitter to send all data for an interval (transmission window) is defined by T1amax-T1amin. This is the allowed time, based on transport and O-RU characteristics, and its impacts on O-DU's is explained in clause 4.4.1.2 of the O-RAN FH C/U/S-Plane standard.

To account for transport variation and transmission time, the receiver similarly implements a reception window. This allows packets containing samples for a specific symbol to be received within the window and still be transmitted at Ra at the time specified in the O-RAN standards. The size of the reception window may account for both the maximum transmission time at the sender and the transport variation through the O-RAN fronthaul network. The result is the first of the delay relationships in the O-RAN FH C/U/S-Plane standard that may be met to ensure a working delay solution (see Table 4.4.2.1-1 et seq.), where T2amax-T2amin is the DL reception window, T1amax-T1amin is the DL transmission window, T4amax-T4amin is the UL reception window, T4amax-T4amin is the UL transmission window, while T12max-T12 min is the allowed DL transport variation and T34max-T34 min is the allowed UL transport variation. A detailed example of such O-RAN timing parameters and relationships in the C/U-Plane is described below in reference to FIGS. 2C and 2D.

Figure 2C:
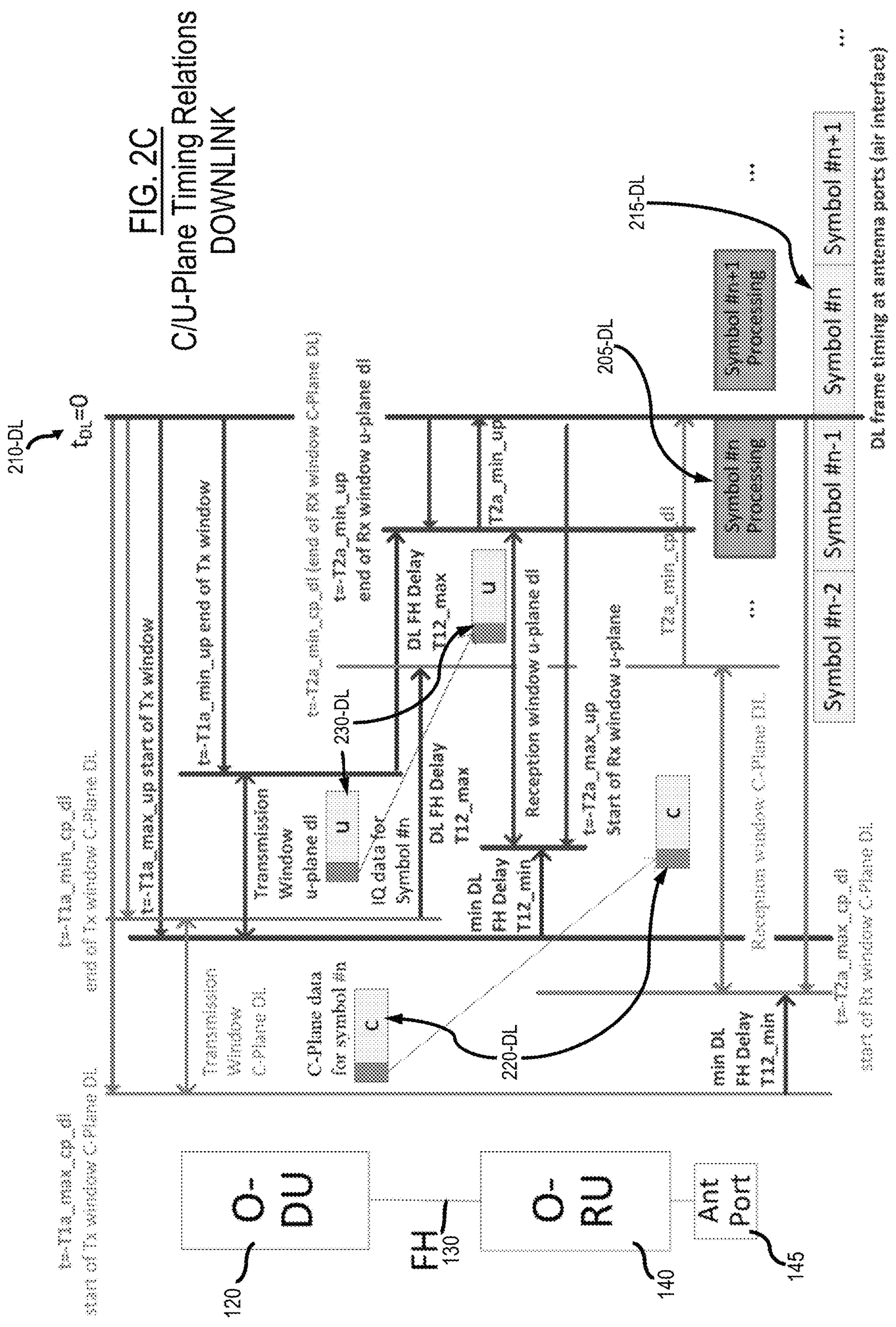
FIG. 2C is a timing diagram of the C/U-Plane downlink on the O-RAN FH link, which may be tested/analyzed by a real-time O-RAN FHA/GUI, according to an example.

FIG. 2C is a timing diagram of the C/U-Plane downlink on the O-RAN FH link 130, which a real-time O-RAN FHA/GUI 150 may test/analyze, according to an example. Generally speaking, FIG. 2C shows the transmission of a C-Plane packet 220-DL from the O-DU 120 and its reception at the O-RU 140 (the C-Plane packet 220-DL itself is shown twice on FIG. 2C, both at its transmission and its reception, connected by an arrow) and the transmission of a U-Plane packet 230-DL from the O-DU 120 and its reception at the O-RU 140 (the U-Plane packet 230-DL itself is shown both at its transmission and its reception, connected by an arrow). The U-Plane packet 230-DL contains IQ data for a symbol #n to be transmitted and the C-Plane packet 220-DL contains control data for symbol #n (and thus for the U-Plane packet 230-DL), therefore the C-Plane packet 220-DL should arrive at the O-RU 140 before the U-Plane packet 230-DL.

As shown in FIG. 2C, the C/U-Plane downlink timing parameters may be defined according to $t_{DL}=0$ (indicated by reference numeral 210-DL), which is the time of the beginning of the transmission of the symbol #n (indicated by reference numeral 215-DL) from the antenna 145 of the O-RU 140, after the end of the processing of the symbol #n (indicated by reference numeral 205-DL) at the O-RU 140. As stated above, the C-Plane packet 220-DL contains control data for symbol #n (and thus for the U-Plane packet 230-DL), and should be received at O-RU 140 before the U-Plane packet 230-DL. Table 1 below lists C/U-Plane downlink timing parameters for analytical timing measurements involving the O-RAN FH link 130, some of which are indicated in FIG. 2C:

TABLE 1

| O-RAN FH C/U-Plane Downlink Parameters | | | | |
|---|---|---|---|---|
| Parameter | Dir. | Pl. | Definition | Notes |
| T12 | DL | — | From output at O-DU (R1) to reception at O-RU (R2) | |
| T12_min | DL | — | Minimum transport delay between O-DU and O-RU | Minimum FH DL delay |
| T12_max | DL | — | Maximum transport delay between O-DU and O-RU | Maximum FH DL delay |
| T1a | DL | — | From output at O-DU (R1) to transmission over the air (Ra) | |
| T1a_max | DL | — | Earliest possible time between when the O-DU may transmit a message (from R1) and transmittal of that message at the antenna (Ra) | Start of O-DU DL Tx window |
| T1a_min | DL | — | Minimum delay between when the O-DU may transmit a message (from R1) and transmittal of that message at the antenna (Ra) | End of O-DU DL Tx window |
| T1a_max_cp_dl | DL | C | Earliest possible time at which the O-DU may send a control message (from R1) before the transmission at the antenna (Ra at $t_{DL}$ = 0) of the IQ data to which the control message applies | Start of DL C-Plane Tx window (O-DU) |
| T1a_min_cp_dl | DL | C | Minimum delay between when the O-DU may transmit a control message (from R1) and transmittal of the IQ data to which the control message applies at the antenna (Ra at $t_{DL}$ = 0) | End of DL C-Plane Tx window (O-DU) |
| T1a_max_up | DL | U | Earliest possible time at which the O-DU may send an IQ data message (from R1) before the transmission of that IQ data as samples at the antenna (Ra at $t_{DL}$ = 0) | Start of DL U-Plane Tx window (O-DU) |
| T1a_min_up | DL | U | Minimum delay between when the O-DU may transmit an IQ data message (from R1) and transmittal of that IQ data as samples at the antenna (Ra at $t_{DL}$ = 0) | End of DL U-Plane Tx window (O-DU) |
| T2a | DL | — | From reception at O-RU (R2) to transmission over the air (Ra) | |
| T2a_max | DL | — | Earliest possible time between when the O-RU receives a data packet (at R2) and transmittal of first IQ samples at the antenna (Ra) | Start of O-RU DL Rx window |
| T2a_min | DL | — | Minimum O-RU processing delay between receipt of data (at R2) and transmittal of first IQ samples at the antenna (Ra) | End of O-RU DL Rx window |
| T2a_max_cp_dl | DL | C | Earliest possible time at which the O-RU may receive a control message (at R2) before the transmission at the antenna (Ra at $t_{DL}$ = 0) of the IQ data to which the control message applies | Start of DL C-Plane Rx window (O-RU) |
| T2a_min_cp_dl | DL | C | Minimum O-RU processing delay between receipt of a control message (at R2) and the transmission at the antenna (Ra at $t_{DL}$ = 0) of the IQ data to which the control message applies | End of DL C-Plane Rx window (O-RU) |
| T2a_max_up | DL | U | Earliest possible time at which the O-RU may receive (at R2) an IQ data message before the transmission of that IQ data as samples at the antenna (Ra at $t_{DL}$ = 0) | Start of DL U-Plane Rx window (O-RU) |
| T2a_min_up | DL | U | Minimum O-RU processing delay between receipt of an IQ data message (at R2) and transmittal of that IQ data as samples at the antenna (Ra at $t_{DL}$ = 0) | End of DL U-Plane Rx window (O-RU) |
| Tcp_adv_dl | DL | C/U | Time difference (advance) between the reception window for the downlink control messages and the reception window of the data messages to which the control messages apply | |

Figure 2D:
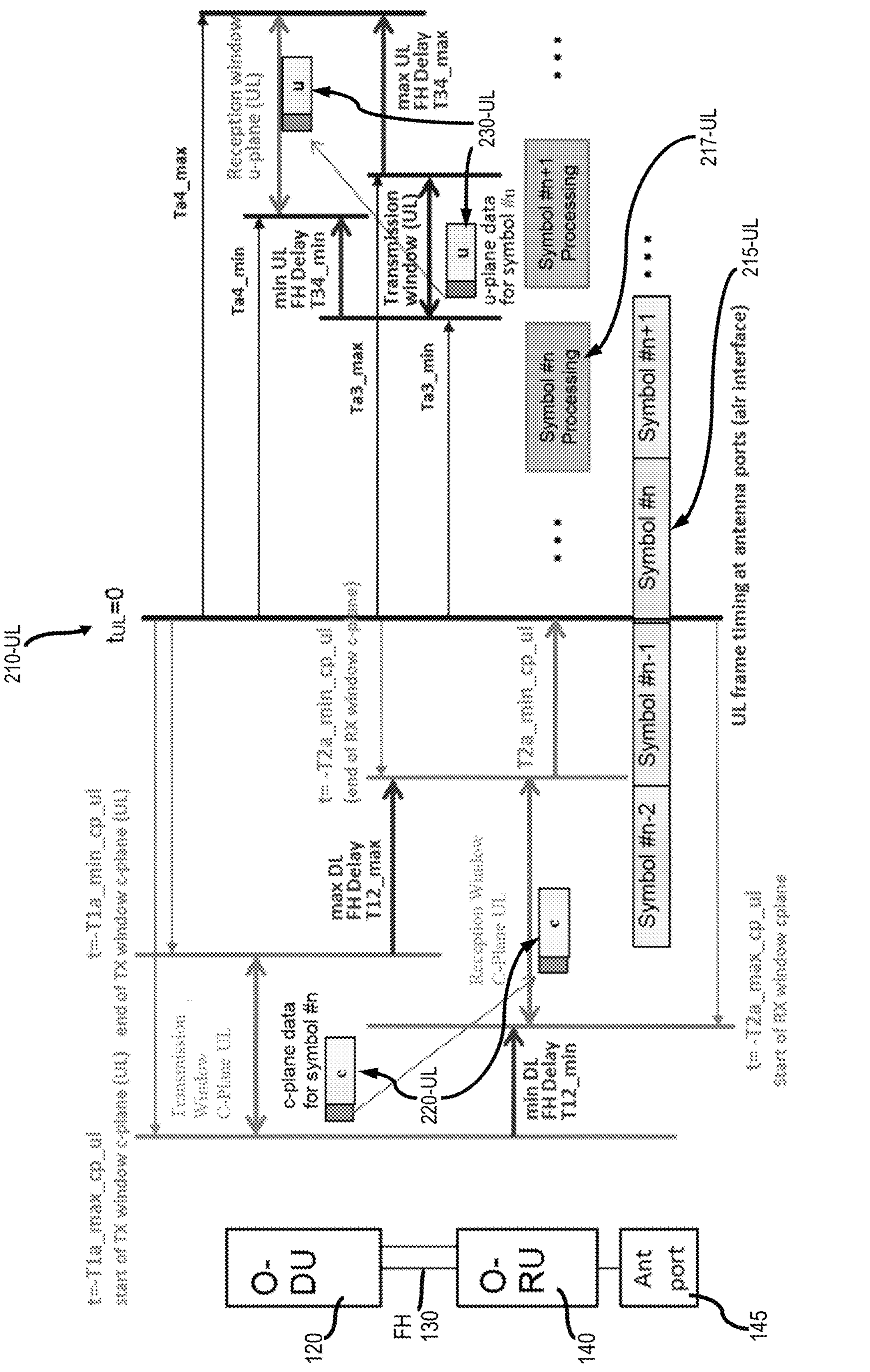
FIG. 2D is a timing diagram of the C/U-Plane uplink on the O-RAN FH link, which may be tested/analyzed by a real-time O-RAN FHA/GUI, according to an example.

FIG. 2D is a timing diagram of the C/U-Plane uplink on the O-RAN FH link 130, which a real-time O-RAN FHA/GUI 150 may test/analyze, according to an example. Generally speaking, FIG. 2D shows the transmission of a C-Plane packet 220-UL from the O-DU 120 and its reception at the O-RU 140 (the C-Plane packet 220-UL itself is shown twice on FIG. 2D, both at its transmission and its reception, connected by an arrow) and the transmission of a U-Plane packet 230-UL from the O-RU 140 and its reception at the O-DU 120 (the U-Plane packet 230-UL itself is shown both at its transmission and its reception, connected by an arrow). The U-Plane packet 230-UL contains IQ data from a symbol #n which was received, and the C-Plane packet 220-UL contains control data for the received symbol #n (and thus for the U-Plane packet 230-UL), therefore the C-Plane packet 220-UL should arrive at the O-RU 140 before the symbol #n. Because the O-DU 120 sends the control messages to the O-RU 140, the C-Plane packet 220-UL is transmitted on the downlink, although its control data applies to the uplink.

symbol #n is received (at 215-UL) and then processed (at 217-UL) by O-RU 140 for the creation and transmittal of the U-Plane packet 230-UL. Table 2 below lists C/U-Plane uplink timing parameters for analytical timing measurements involving the O-RAN FH link 130, some of which are indicated in FIG. 2D:

TABLE 2

O-RAN FH C/U-Plane Uplink Parameters

| Parameter | Dir. | Pl. | Definition | Notes |
|---|---|---|---|---|
| T12_min | UL (DL) | C | Minimum transport delay between O-DU and O-RU | Minimum FH DL delay (for control messages concerning incoming UL data) |
| T12_max | UL (DL) | C | Maximum transport delay between O-DU and O-RU | Maximum FH DL delay (for control messages concerning incoming UL data) |
| T1a_max_cp_ul | UL (DL) | C | Earliest possible time at which the O-DU may send a control message (from R1) before the reception at the antenna (Ra) of the IQ data to which the control message applies | Start of [UL] C-Plane Tx window (O-DU) |
| T1a_min_cp_ul | UL (DL) | C | Minimum delay between when the O-DU may transmit a control message (from R1) and transmittal of the IQ data to which the reception at the antenna (Ra) of the IQ data to which the control message applies | End of [UL] C-Plane Tx window (O-DU) |
| T2a_max_cp_ul | UL (DL) | C | Earliest possible time at which the O-RU may receive a control message (at R2) before the reception at the antenna (Ra) of the IQ data to which the control message applies | Start of [UL] C-Plane Rx window (O-RU) |
| T2a_min_cp_ul | UL (DL) | C | Minimum O-RU processing delay between receipt of a control message (at R2) and the reception at the antenna (Ra) of the IQ data to which the control message applies | End of [UL] C-Plane Rx window (O-RU) |
| T34 | UL | — | From output at O-RU (R3) to reception at O-DU (R4) | |
| T34_min | UL | — | Minimum transport delay between O-RU (R3) and O-DU (R4) | Minimum FH UL delay |
| T34_max | UL | — | Maximum transport delay between O-RU (R3) and O-DU (R4) | Maximum FH UL delay |
| Ta3 | UL | — | From reception at O-RU antenna (Ra) to transmission from O-RU (R3) | |
| Ta3_max | UL | U | Maximum delay between when the message is received at the antenna (Ra) and when the O-RU may transmit the message (from R3) to the O-DU | End of UL U-Plane Tx window (O-RU) |
| Ta3_min | UL | U | Earliest possible time at which the O-RU may transmit a message to O-DU at R3 after receipt of the message at the antenna (Ra) | Start of UL U-Plane Tx window (O-RU) |
| Ta4 | UL | — | From reception at O-RU antenna (Ra) to reception at O-DU (R4) | |
| Ta4_max | JL | U | Maximum delay between when the message is received at the antenna (Ra) and the O-DU may receive the message (at R4) from the O-RU | End of UL U-plane Rx window (O-DU) |
| Ta4_min | UL | U | Earliest possible time at which the O-DU may receive a message at R4 after receipt of the message at the antenna (Ra) | Start of UL U-Plane Rx window (O-DU) |

As shown in FIG. 2D, the C/U-Plane uplink timing parameters may be defined according to $t_{UL}=0$ (indicated by reference numeral 210-UL), which is the time of the beginning of the reception of the symbol #n (indicated by reference numeral 215-UL) at the antenna 145 of the O-RU 140. After the end of the processing of the symbol #n (indicated by reference numeral 217-DL) at the O-RU 140, the U-Plane packet 230-UL is transmitted on the O-RAN FH link 130 from the O-RU 140 to the O-DU 120. As stated above, the C-Plane packet 220-UL contains control data for symbol #n (and thus for the U-Plane packet 230-UL), and should be received at O-RU 140 before the $t_{UL}=0$ (210-UL), when the The above description is only of some specific examples, the full range and details of windows and other higher-level timing parameters which are to be met by a working O-RAN fronthaul link are detailed in, inter alia, the O-RAN FH C/U/S-Plane standard, the O-RAN FH M-Plane standard, and the O-RAN FH IoT standard-any and all of which may be measured/analyzed by a real-time O-RAN FHA/GUI 150 according to examples of the present disclosure. For example, a real-time O-RAN FHA 150 according to examples of the present disclosure may be able to measure/analyze the timing parameters as detailed in Sect. 11.2.5 ("Synchronization accuracy") of the O-RAN FH C/U/S-Plane standard, including the various types of Time Error (TE), such as, e.g., the absolute value of the Time Error (|TE(t)|), Constant Time Error (cTE), Dynamic Time Error (dTE(t)), the slow changes in Time Error after low-pass filtering (TEL(t)), the absolute value of the Time Error as measured at the antenna 145 of the O-RU 140 with respect to an ideal time reference (|TE|antenna), the absolute value of the Time Error contributed by the O-RU 140 measured from its input to its output (|TE|o-RU), the absolute value of the Time Error contributed by the O-DU 120 measured from its network input to its output (|TEL|O-DU), the absolute value of the Time Error contributed by a fronthaul network, measured from its input to its output (|TE|network), Time Alignment Error (TAE), Jitter (Sect. 11.2.5.2), Wander (Sect. 11.2.5.3), and Air interface frequency error (Sect. 11.2.5.4). As other examples, a real-time O-RAN FHA/GUI 150 according to examples of the present disclosure may be able to measure/analyze/determine other kinds of parameters besides timing parameters, such as those detailed in Sect. 7.2.3 ("Mixed Numerology and PRACH handling") of the O-RAN FH C/U/S-Plane standard, and other parameters regarding resource allocation such as, e.g., PRB allocation and usage, TDD allocation and usage, FDD allocation and usage, etc., as would be understood by one of ordinary skill in the art.

Moreover, a real-time O-RAN FHA 150 according to examples of the present disclosure may be able to measure/analyze any other parameters, windows, tolerances, measurements, etc., detailed in any of the O-RAN standards, even if the specific O-RAN standard is not described herein, including, but not limited to, for example, the Wavelength Division Multiplexing (WDM) Fronthaul Transport Specification of O-RAN Working Group 9 (ORAN-WG9.WDM.0-R003-v03.0); the End-to-End System Testing Framework Specification of O-RAN Test and Integration Focus Group (O-RAN.TIFG.E2ETSTFWK.0-v01.00); the End-to-End Test Specification of O-RAN Test and Integration Focus Group (O-RAN.TIFG.E2E-Test.0-v04.00); the Conformance Test Specification of O-RAN Working Group 4 (O-RAN.WG4.CONF.0-R003-v08.00); the Hardware Reference Design Specification for Fronthaul Gateway of O-RAN Working Group 7 (O-RAN.WG7.FHGW-HRD.0-v02.00); the O1 Interface Specification for O-DU of O-RAN Working Group 5 (O-RAN.WG5.O-DU-O1.0-R003-v07.00); the Use Cases Detailed Specification of O-RAN Working Group 1 (O-RAN.WG1. Use-Cases-Detailed-Specification-R003-v11.00); and the O-RAN Security Test Specifications of O-RAN Working Group 11 (O-RAN.WG11.SecTestSpecs-v04.00).

According to some examples of the present disclosure, a real-time O-RAN FHA 150 may also measure/analyze other parameters (such as, e.g., Key Performance Indicators (KPIs) of LTE and 5G NR), windows, tolerances, measurements, etc., from other standards referred to in the O-RAN standards such as, for example, eCPRI; 3GPP TS 36.141, TS 36.213, TS 38.133, TS 38.211, and 38.323; and International Telecommunications Union (ITU) Recommendations G.8260 (Definitions and terminology for synchronization in packet networks) and its amendments, G.8261 (Timing and synchronization aspects in packet networks) and its amendments, G.8262 (Timing characteristics of a synchronous Ethernet equipment slave clock) and its amendments, G.8264 (Distribution of timing information through packet networks) and its amendments, G.8271 (Time and phase synchronization aspects of telecommunication networks) and its amendments, G.8272 (Timing characteristics of primary reference time clocks) and its amendments, G.8273 (Timing characteristics of telecom boundary clocks and telecom time slave clocks) and its amendments, and G.8275 (Precision time protocol telecom profile for phase/time synchronization with full timing support from the network) and its amendments, each of which is hereby incorporated by reference in its entirety. According to some examples of the present disclosure, a real-time O-RAN FHA/GUI 150 may also measure/analyze other parameters, windows, tolerances, measurements, etc., from other standards which are not explicitly referred to in the O-RAN standards, but may be suitable for testing the O-RAN FH link 130, as would be understood by one of ordinary skill in the art.

As would be understood by one of ordinary skill in the art, additional components and/or hardware may be needed to perform some of these measurements, and examples of the present disclosure may include such additional components and/or hardware, which may be integrated into the real-time O-RAN FHA/GUI 150, and/or the real-time O-RAN FHA/GUI 150 may have a wired/wireless connection for communicating with such additional components and/or hardware (such as, e.g., over the Internet). For instance, certain TE measurements may require an RF receiver.

As used herein, the term "analytical timing measurements" may include, for example, any parameter, measurement, quantity, and/or quality discussed, described, and/or identified in any of the O-RAN and/or related standards, and/or relevant/suited for testing and/or analyzing the O-RAN FH link 130, some of which are discussed, described, and explained in the above paragraphs, as would be understood by one of ordinary skill in the art. As mentioned above, the O-RAN and any related standards are continually evolving and changing, and so are the parameters, measurements, quantities, and/or qualities relevant/suited for testing and/or analyzing the O-RAN FH link 130, thus the term "analytical timing measurements" may include, for example, any parameter, measurement, quantity, and/or quality changed and/or newly discussed, described, and/or identified in any future O-RAN and/or related standards, and/or that become otherwise relevant/suited for testing and/or analyzing the O-RAN FH link 130 in the future. In some examples, an O-RAN FHA 150 according to the present disclosure may also track, test, analyze, and/or otherwise measure parameters, measurements, quantities, and/or qualities related to the midhaul and/or backhaul links, as well as to the air interface between the UE 160 and RF antenna 145.

At least because O-RAN is predicated upon, inter alia, providing standards/specifications for the successful interoperability between the O-DU 120 and O-RU 140 on the O-RAN FH link 130 so that different telecommunication systems may be implemented by using various components from multiple vendors, the timing details, parameters, and tolerances of the communications on the O-RAN FH link 130 may also have standardized, industry-wide testing parameters to guarantee workability, many of which are described and detailed in the O-RAN FH C/U/S-Plane standard, the O-RAN FH M-Plane standard, and the O-RAN FH IoT standard. Accordingly, the O-RAN FH IoT standard lists and details test configurations, parameters, the O-RAN standards, including, e.g., the O-RAN FH C/U/S-Plane standard, the O-RAN FH M-Plane standard, and the O-RAN FH IoT standard, list and detail test configurations, parameters, measurements, etc., which may be used to prove the interoperability of any O-DU 120 with any other O-RU 140 over any O-RAN FH link 130.

For instance, the O-RAN FH IoT standard describes many tests for each of the C/U-Plane (sect. 2.2.3), the S-Plane (sect. 2.2.2), and the M-Plane (sect. 2.2.1) by the FHA, as well as appropriate testing tools and parameters. Moreover, other components and instruments may be used with the FHA to perform these tests, such as an O-CU emulator (including, e.g., 5G NR O-CU emulator), a network core emulator, an evolved Node B (eNB) emulator (including, e.g., a 4G LTE Master eNB (MeNB) or other MeNB emulator), an UE testers/emulator, optional beamforming network equipment, an Application Test Server, an RF Spectrum and/or Beam Signal Analyzer, and O-RU emulator, a flow traffic emulator, etc., as discussed at, e.g., Sect. 2.1.1.3 of the O-RAN FH IoT standard. As would be understood by one of ordinary skill in the art, the various examples in the present disclosure may be intended for use (and to be compliant) with both present, currently planned, and future testing protocols of the O-RAN FH IoT standard. See, e.g., Sect. 1.2.3 of the O-RAN FH IoT standard ("Future Enhancements"). However, as would also be understood by one of ordinary skill in the art, the various examples in the present disclosure are not in any limited by the present or future O-RAN FH IoT standard, but may be used for many other types of testing.

As mentioned above, there are multiple challenges with testing the O-RAN FH link 130, some but not all of which are discussed herein. Despite providing an intensive description of what is to be tested, the O-RAN standards provide no guidance on how to perform those tests, including how to create instrumentalities to provide such testing results. Moreover, previous telecommunication link analyzers provide limited guidance to creating such testing instrumentalities as some of the O-RAN testing parameters may be new and unique in detail and implementation to the O-RAN FH link 130, which effectively divides what was once a single component and layer (the PHY layer) into two components and two sub-layers (and the upper PHY layer for the O-DU and the lower PHY layer for the O-RU), thereby requiring relatively tight timing tolerances between the two (to at least match the overall timing of the previously-single device/component).

Presently, at least partially because of the new and novel nature of the O-RAN FH link 130 and its requirements, many who attempt to perform O-RAN FH link 130 testing have struggled to build their own ad hoc software and hardware for such testing. As far as is known, most instrumentalities that perform O-RAN FH link 130 testing use a capture method, where a snapshot of the O-RAN FH link 130 traffic flow may be captured (i.e., recorded/stored) in hardware and then analyzed, after the fact, usually in software (i.e., post-processing). Because of the tight timing and speed of the traffic flow on the O-RAN FH link 130, such instrumentalities may not be able to handle the traffic flow, becoming quickly overwhelmed by the flood of packets, even before the software may be able to perform any type of analysis. Furthermore, even with instrumentalities that perform O-RAN FH link 130 testing using the capture method, many parts of the analysis and processing required for O-RAN FH link 130 analysis may be performed sequentially, thereby delaying the analysis and processing in general. Furthermore, analysis of a snapshot does not take into consideration packets outside of the snapshot which may be outside tolerances.

As mentioned above, examples of a real-time O-RAN FHA 150 according to the present disclosure provide real-time analysis, processing, and measurement in hardware of the O-RAN FH link 130, rather than (and/or in addition to) post-processing in software of captured packets/frames from the O-RAN FH link 130. In examples of a real-time O-RAN FHA 150 according to the present disclosure, packet analysis may be performed/implemented in parallel in hardware, rather than serially in post-processing by software reading and accessing captured frames/packets. In examples of a real-time O-RAN FHA 150 according to the present disclosure, low level analysis of packet traffic flow over the O-RAN FH link 130 may be performed/implemented in hardware for continuous real-time processing, rather than (and/or in addition to) being performed by after-the-fact post-processing in software of captured packets/frames from the O-RAN FH link 130.

Figure 3:
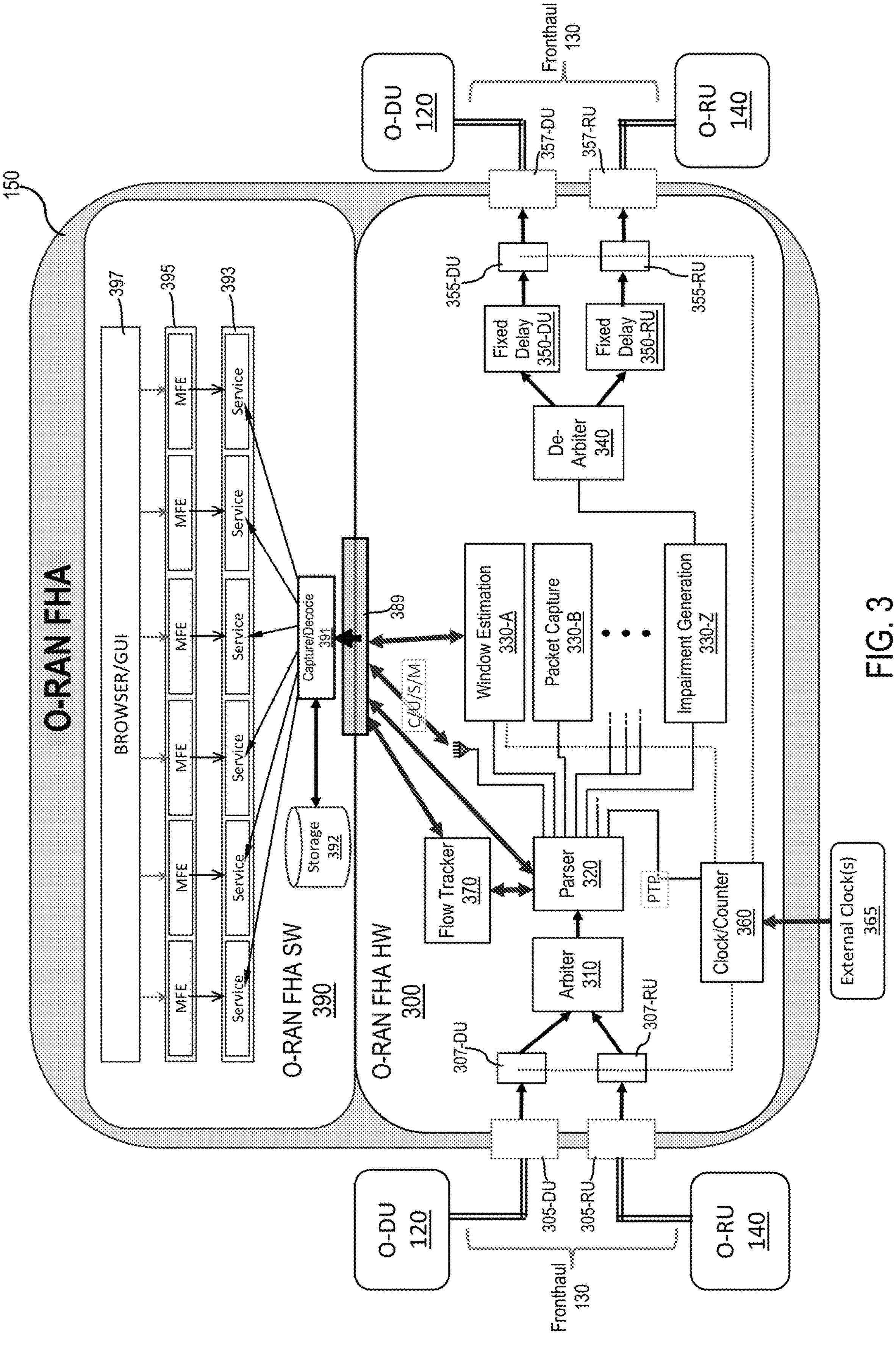
FIG. 3 is a block diagram illustrating components of a real-time O-RAN FHA, according to an example.

FIG. 3 is a block diagram illustrating components of a real-time O-RAN FHA 150, according to an example. The number and arrangement of components shown in FIG. 3 are provided as an example. In practice, a real-time O-RAN FHA 150 according to examples of the present disclosure may include additional components, fewer components, different components, or differently arranged components than those shown in FIG. 3. Additionally, or alternatively, a set of components (e.g., one or more components) of a real-time O-RAN FHA 150 according to examples of the present disclosure may perform one or more functions described as being performed by another set of components of a real-time O-RAN FHA 150 according to examples of the present disclosure, as would be understood by one of ordinary skill in the art.

FIG. 3 may further omit parts, components, circuit paths, etc., in the real-time O-RAN FHA 150 not directly germane to examples of the present disclosure, as would be understood by one of ordinary skill in the art. For instance, a circuit path for a low latency/non-intrusive packet flow through the real-time O-RAN FHA 150 which may by-pass most of the components in the real-time O-RAN FHA 150 by more or less directly linking the inputs and outputs, is not shown in FIG. 3.

In FIG. 3, an O-RAN FH link 130 may be between an O-DU 120 and an O-RU 140. A real-time O-RAN Fronthaul Analyzer (FHA) 150 may include a hardware component (HW) 300 and a software component (SW) 390. As would be understood by one of ordinary skill in the art, while called the software component, the O-RAN FHA SW 390 may include hardware on which the software would run, and the term O-RAN FHA SW 390 may be used to distinguish those parts of the real-time O-RAN FHA 150 whose relevant components (e.g., those components for testing, analyzing, and measurements, as well as generating content for, and interpreting commands from, a user I/O interface) exist in the form of software/firmware from those parts of the real-time O-RAN FHA 150 whose relevant components (e.g., those components for testing, analyzing, and measurements, as well as generating content for, and interpreting commands from, a user I/O interface) exist in the form of hardware/firmware, i.e., the O-RAN FHA HW 300.

In some examples, the O-RAN FHA HW 300 may include a hardware accelerator. As used herein, a "hardware accelerator" may be any group of programmable logic blocks with reconfigurable interconnects, such as, e.g., a Programmable Logic Device (PLD) and/or Programmable Read-Only Memory (PROM), and may include an Application-Specific Integrated Circuit (ASIC), a programmable gate array, a Field Programmable Gate Array (FPGA), and/or Configurable Logic Blocks (CLBs) with Lookup Tables (LUTs), Reconfigurable Acceleration Devices (RADs), and may have one or more soft processor cores, one or more hard processor cores, one or more general purpose Advanced Reduced Instruction Set Computer (RISC) Machine (ARM) core processors, one or more vector processors, one or more memories, one or more inputs and/or outputs, one or more memory controllers, one or more Networks-on-Chip (NoCs) to provide a pervasive system-wide network, one or more network controllers, one or more network interfaces, and/or one or more transceivers, as would be understood by one of ordinary skill in the art. In some examples, the hardware accelerator may include an FPGA and associated peripherals, such as, e.g., one or more Double Data Rate (DDR) memories, one or more clocks, one or more Phase-Locked Loops (PLLs), etc., as would be understood by one of ordinary skill in the art.

An overview of the traffic flow through the O-RAN FHA HW 300 in FIG. 3 is presented below. In some examples, the packet traffic flow on the O-RAN FH link 130 may include Ethernet packets of varying configurations such as, e.g., 10 Gb, 25 Gb, and 100 Gb.

As shown in FIG. 3, the packet flow traffic from O-DU 120 may enter FHA HW 300 by an input 305-DU, while the packet flow traffic from O-RU 140 may enter FHA HW 300 by an input 305-RU. In some examples, each of the inputs 305-DU and 305-RU may include a Quad Small Form-factor Pluggable (QSFP) transceiver/interface port. The O-DU packet flow from the input 305-DU and the O-RU packet flow from the input 305-RU then may be forwarded to a Medium Access Controller (MAC) receiver 307-DU and a MAC receiver 307-RU, respectively, which may timestamp all of the packets in the incoming flows using the timing clock signal (shown by the dotted line) from a Counter 360. The timing clock signal from the Counter 360 may set a system-wide standard time by which the O-RAN FHA HW 300 may perform analysis, in hardware, of the packet traffic flow in real time (examples of which are described in greater detail below) and the O-RAN FHA SW 390 may perform analysis of the packet traffic flow and generate continuous real-time output representing data concerning the O-RAN FH link 130. As used herein, the phrase "maintain a clock" may refer to selecting and/or generating a reference timing signal for system-wide use on the hardware accelerator.

The Counter 360 may maintain a clock using, for example, incoming S-Plane PTP packets from a PTP master at the O-DU 120 (routed to the Counter 360 by the Parser 320, discussed further below), one or more External Clocks 365, and/or a stable internal oscillator which may keep time within a billionth of a second deviation (i.e., nanosecond timing resolution). In some examples, the stable internal oscillator may include a Voltage-Controlled Oscillator (VCO). Under some conditions, including, e.g., when the packet traffic flow on the O-RAN FH link 130 is on-time and not congested, the Counter 360 may use the PTP timing information in the incoming S-Plane PTP packets. Under some conditions, including, e.g., when the packet traffic flow on the O-RAN FH link 130 is delayed (perhaps caused by congestion) or when the timing received via the incoming S-Plane PTP packets is otherwise degraded, the Counter 360 may switch to External Clock(s) 365 and/or a highly accurate internal timing oscillator.

In some examples, the Counter 360 may include a hardware module which may receive and parse in-coming PTP packets in order to synchronize the Counter 360. In some examples, such a hardware module may include an ARM core processor embedded in the O-RAN FHA HW 300. In some examples, such a hardware module may include a processor from the x86 family, a PowerPC (PPC) processor, and/or an Intel multicore processor. The External Clock(s) 365 may be any suitable reference time source, as would be understood by one of ordinary skill in the art. In some examples, the External Clock(s) 365 may provide one or more Global Navigation Satellite System (GNSS) timing signals, such as, e.g., a Global Positioning System (GPS) timing signal. In some examples, the External Clock(s) 365 may provide both a one pulse per second (1PPS) signal and a Time of Day (ToD) signal, which may be used to synchronize the Counter 360. In some examples, the External Clock(s) 365 may include one or more external clock generation/synchronization subsystems and/or chips.

In some examples, the Counter 360 may include a ToD counter which may be initialized and incremented by an internal clock that has its frequency adjusted by at least one of the following inputs: the PTP packets received from/on the circuit path 320*t*; a 1PPS signal at 10 MHz from the External Clock(s) 365; and/or a 1PPS/ToD signal from the External Clock(s) 365. In some examples, the Counter 360 may be a register with a suitable number of bits to maintain a sufficient timing accuracy—for instance, 64 bits may be sufficient to maintain a timing accuracy within about one nanosecond. In some examples, the Counter 360 may be implemented as a hardware register with logic gates, clocked by an internal oscillator, and accessible by other components via a memory mapped address.

In some examples, the Counter 360 may include an auto-detect mechanism to select which timing signal source to use as a primary timing signal, e.g., the PTP packets (parsed and synchronized in hardware circuitry), one or more External Clock(s) timing signals (e.g., GPS signals, timing package/chip signals), and/or an internal timing signal generated by an on-board timing oscillator capable of nanosecond resolution. In some examples, the user may choose a primary timing source and/or select an auto-detect mechanism in order to synchronize the Counter 360. In some examples, the Counter 360 may combine two or more timing sources together to generate a primary timing signal. In some examples, the Counter 360 may recover synchronization for Synchronous Ethernet (SyncE) transparency. In some examples, the real-time O-RAN FHA 150 may provide bidirectional SyncE clock recovery, which may avoid any break/interrupt of the SyncE line frequency from, e.g., the O-DU 120 to the O-RU 140 (in network configuration LLS-C1), which may be beneficial when in either intrusive mode. In such examples, the real-time O-RAN FHA 150 may provide SyncE line transparency in each direction ("bidirectional SyncE clock transparency"), i.e., a recovered clock from inputs 305 to transmit clock of outputs 357 and vice-versa, which may be beneficial for both the non-intrusive and intrusive modes.

In typical telecommunication link analyzers, such low level timing synchronization and analysis per packet may be performed mostly via software on one or more captured packets/frames of the packet traffic flow on the link (i.e., post-processing of captured traffic packets/frames in storage/memory). By contrast, the O-RAN FHA HW 300 according to examples of the present disclosure provides processing such as, e.g., low level timing synchronization and analysis on a per packet basis, in real-time (i.e., real-time-processing of tapped traffic packets/frames currently being transmitted/received on the O-RAN FH link 130).

Returning to the packet traffic flow through the O-RAN FHA HW 300, the timestamped packets from each of the MAC receivers 307-DU and 307-RU may then be combined by an Arbiter 310 into a single stream. In some examples, the resulting single stream has twice the data rate as the individual O-DU or O-RU packet flows. Combining the two flows at high speed in hardware into a single stream may be helpful at least because some of the timing parameters, measurements, and tolerances analyzed in the real-time O-RAN FHA are based on the relative timings of packets from one flow with the packets of another. For instance, as discussed above, because each C-Plane packet (transmitted on the downlink) associated with an uplink U-Plane packet should be received before the associated uplink U-Plane packet is transmitted, having both the C-Plane packet from the downlink and its associated U-Plane packet from the uplink immediately available in the same stream may be beneficial when performing, for example, a C/U-Plane Timing Analysis. In some examples, the Arbiter 310 may combine additional packet traffic flows with the O-DU and O-RU packet flows.

The single stream of timestamped packets then enters the Parser 320 which may appropriately sort and route the packets by parsing the appropriate header information in each packet. In some examples, the sorting and routing may also be determined by user set criteria and/or parameters set by the type of analyses being performed in the real-time O-RAN FHA 150. As used herein, the term "routing criteria" may refer to any set of one or more conditions, parameters, and/or qualities of any packet and/or frame on an O-RAN FH link 130 (and thus, like in common usage, the term "criteria" as used herein may refer to either or both the singular and the plural, like "agenda" and "data").

As shown in FIG. 3, multiple circuit paths may lead out from the Parser 320 to other components on the O-RAN FHA HW 300, including, for example, a circuit path 320*a* to a Window Estimation hardware packet analyzer 330-A, a circuit path 320*b* to a Packet Capture hardware packet analyzer 330-B, a circuit path 320*c* to a HW/SW interface 389 with the O-RAN FHA SW 390, a circuit path 320*t* to the Counter 360, multiple unlabeled circuit paths (indicated by dashed lines) to other possible hardware packet analyzers and/or other components with other functionalities, a circuit path 320*z* to an Impairment Generation hardware packet analyzer 330-Z, and many other circuit paths not specifically shown in FIG. 3 to other possible components on the O-RAN FHA HW 300 not specifically shown here. For example, an up-down arrow between the Parser 320 and the Flow Tracker 370 indicates one or more circuit paths with communications going in both directions (as both control instructions and metadata, among other information, may flow between the Parser 320 and the Flow Tracker 370). The multiple circuit paths leading to and from the Parser 320 may carry, in addition to packets routed by the Parser 320 according to a routing criteria, control instructions (such as, e.g., action bits and/or action fields), data, metadata, and the like, some of which are described in greater detail below. As used herein, "hardware packet analyzer" refers to any type of hardware component or module in/on the O-RAN FHA HW 300 that may process, analyze, measure, scan, quantify, estimate, evaluate, modify, and/or further parse any packet received by the O-RAN FHA 150. In some examples, a hardware packet analyzer may include digital and/or analog circuitry (e.g., one or more transistors, logic gates, registers, memory devices, resistive elements, conductive elements, capacitive elements, and/or the like, as would be understood by one of ordinary skill in the art) and/or more complex discrete hardware components such as, e.g., a single- and/or multi-chip processor, a single- and/or multi-core processor, a digital signal processor (DSP), an application specific integrated circuit (ASIC), a field programmable gate array (FPGA), or other programmable logic device, discrete gate or transistor logic, other discrete hardware components, and/or any combination thereof suitable to perform any of the functions described herein, as would be understood by one of ordinary skill in the art.

In some examples, the Parser 320 may use metadata parsed from the headers of the incoming packets along with routing criteria in order to perform certain functions. For example, as described in detail below, if a C/U-Plane Timing Analysis is to be performed, the Parser 320 may, in accordance with the routing criteria, use the parsed metadata to identify the packets in the C/U-Plane, and then may route those identified C/U-Plane packets on the circuit path 320*a* to the Window Estimation hardware packet analyzer 330-A where C/U Timing Analysis may be performed. As another example, as described in detail below, if a Packet Capture operation is to be performed, the routing criteria may indicate what kind, type, and/or number of packets are to be captured, the Parser 320 may, in accordance with the routing criteria, use the parsed metadata to identify the packets to be captured, and then may route those identified packets on the circuit path 320*b* to the Packet Capture hardware packet analyzer 330-B. As another example, as described in detail above, the Counter 360 may use the incoming S-Plane PTP packets as part of maintaining the clock, thus the Parser 320 may, in accordance with the routing criteria for the timing functionality, use the parsed metadata to identify the S-Plane PTP packets, and then may route those identified S-Plane PTP packets on the circuit path 320*t* to the Counter 360. In such an example, the Counter 360 may include PTP processing software and a suitable servo (such as, e.g., the embedded ARM core processor discussed above). As yet another example, if the O-RAN FHA SW 390 is to perform a higher-level M-Plane analysis, the Parser 320 may, in accordance with the routing criteria for the higher-level M-Plane analysis, use the parsed metadata to identify the packets in the M-Plane, and then may route those identified M-Plane packets on the circuit path 320*c* to the HW/SW interface 389 for transmittal to the O-RAN FHA SW 390 for the higher-level M-Plane analysis.

In some examples, the Parser 320 parses specific header fields of the incoming packets for metadata and may use the resulting metadata to appropriately route individual packets and/or packet flows and/or supply the metadata to the Flow Tracker 370. In some examples, the Parser 320 may be implemented as a Programming Protocol-independent Packet Processor (P4), which is an open source, domain specific programming language for network devices, specifying how data plane devices (switches, routers, Network Interface Controllers (NICs), filters, etc.) process packets in hardware. In some examples, the Parser 320 may be designed directly using Hardware Description Language (HDL) and/or implemented using Node Processing Unit (NPU) type blocks/functions, Tensor Processing Units (TPUs), and/or any other suitable means, as would be understood by one of ordinary skill in the art. In some examples, P4 tables may be implemented using multiple memory mapped tables, such as, e.g., Content Addressable Memory (CAM), Direct CAM (DCAM), Binary CAM (BCAM or BiCAM), Ternary CAM (TCAM), Semi-Ternary CAM (STCAM) tables; block RAM (BRAM), ultra-RAM (URAM), and the like; as well as other hash tables with match fields, as would be understood by one of ordinary skill in the art.

In some examples, the Flow Tracker 370 may use the metadata from the Parser 320 to track whether each Ethernet frame is a new type of frame flow or a frame flow that has been received before. In some examples, the metadata parsed by the Parser 320 and/or used by the Flow Tracker 370 may include, for example, a source address, a destination address, a MAC address, a Virtual Local Area Network (VLAN) tag and ID, an EtherType, an eCPRI Message Type, an extended Antenna-Carrier identification (eAxC ID), data direction, source IP address, destination IP address, etc., as would be understood by one of ordinary skill in the art. The Flow Tracker 370 may maintain details and statistics for each flow-if there is a new flow, it may be entered and initialized for tracking by the Flow Tracker 370; if it is an existing flow, the statistics for that flow may be updated (for example, its frame and byte count may be incremented). Statistics maintained by the Flow Tracker 370 may include, for example, packet count, the total bytes of each flow, timestamps of corresponding packets, etc. The Flow Tracker 370 may allow the tracking of the complete information about each flow, such as, e.g., each individual C-Plane, U-Plane, S-Plane, and M-Plane packet flows on the O-RAN FH link 130. In some examples, the Flow Tracker 370 may be implemented as pipeline arrays and processor-less block RAM (BRAM). In some examples, the Parser 320 may parse packets per MAC layer and Layer 2 through Layer 4, as well as basic eCPRI/O-RAN headers, in order that the Flow Tracker 370 may maintain Layer 2 counters and statistics (aggregated per port), as well as flow discovery and tracking per connection. In some examples, components of the O-RAN FHA SW 390 may keep track of which flows are "live" or "active" by recording (and/or monitoring) the timestamp of the last time a flow was detected and/or reported by the Flow Tracker 370, and comparing the current time with the last recorded timestamp.

The O-RAN FHA SW 390 may periodically query and receive data to and from the Flow Tracker 370 via a HW/SW interface 389 for analysis, processing, and then presentation on a Browser/GUI 397. In some examples, the HW/SW interface 389 may include a Peripheral Component Interconnect Express (PCIe) Subsystem, and/or another suitable card/bus subsystem, as would be understood by one of ordinary skill in the art. In some examples, the Browser/GUI of O-RAN FHA SW 390 may present a user with filtering or action selections (such as, e.g., capture, window analysis, real-time software (SW) analysis, etc.) for any user-selected flow. In such examples, when the user chooses a specific packet flow and a matching particular action for that packet flow, O-RAN FHA SW 390 may enter a TCAM function in the Parser 320 with a rule (typically identifying a flow) and the action, which results in action bits indicating the appropriate routing and/or downstream processing for the packet flow. In such examples, this may be how the Parser 320 uses the metadata parsed from the incoming packets to appropriately route individual packets and/or packet flows. One or more hardware packet analyzers 330 perform such downstream processing.

Accordingly, the Parser 320 may route one or more packets and/or packet flows for downstream processing by the one or more hardware packet analyzers 330, which may perform, e.g., analyses, hardware processing, measurements, and/or the like on the particular received packets and/or packet flow(s). In the example of FIG. 3, three different hardware packet analyzers are shown: a Window Estimation hardware packet analyzer 330-A to analyze packet flows in terms of, e.g., transmission/reception windows, latency in general, early/late/on-time packets, etc., a Packet Capture hardware packet analyzer 330-B to capture and analyze packets based on user-set criteria, and an Impairment Generation hardware packet analyzer/block 330-Z to analyze and alter packets in terms of, e.g., latency, delay, and other impairments, etc.

For instance, a user may select the C/U-Plane Timing Analysis function using the O-RAN FHA SW 390, so that the O-RAN FHA SW 390 may configure the TCAM in the Parser 320 with the appropriate rule (i.e., select the C/U-Plane packet flows) and the matching action (i.e., (i) route the selected packet flow to the Window Estimation hardware packet analyzer 330-A; and (ii) direct the Window Estimation hardware packet analyzer 330-A to perform the appropriate hardware processing). In some examples, the selected flow may be accompanied by action bits or an action field (generated by the Parser 320), which serves as instructions/control information for the specific hardware packet analyzer; such action bits/field may be routed via separate control circuitry/pathways from the Parser 230 to each of the hardware packet analyzers 330 as well as other analytical/measuring/processing/etc. components on the O-RAN FHA HW 300.

In this example/instance, the action bits/field accompanying the C/U-Plane packet flows to the Window Estimation hardware packet analyzer 330-A may instruct the Window Estimation hardware packet analyzer 330-A to perform real-time packet analysis in hardware to directly measure/calculate/determine early/late/on-time packet arrival for at least one of the C/U-Plane transmission/reception windows. In some examples, the user may select threshold values for the C/U-Plane Timing Analysis using, for example, a pull-down menu, a touchscreen, or a keyboard of the Browser/GUI 397 of the O-RAN FHA SW 390, which will result in the O-RAN FHA SW 390 programming/instructing/controlling the O-RAN FHA HW 300 to use the entered threshold values as stored hardware register values to be machine matched, set, calculated from, and the results stored in other hardware registers. The O-RAN FHA SW 390 may query those hardware registers in the O-RAN FHA HW 300 based on an event (such as, e.g., user input) or periodically/on a set schedule, and display those values and/or further analyze/process them for higher-level analysis or simpler visual graphical representation. In some examples, the O-RAN FHA SW 390 may set/control the O-RAN FHA HW 300 to continuously transmit the calculated values in real-time so that the Browser/GUI 397 of the O-RAN FHA SW 390 may present a visual display of those values and/or an intuitive graphical representation of the same information to the user in real-time.

In some examples, the Window Estimation hardware packet analyzer 330-A may perform monitoring of the C/U-Plane packets using CAM filtering rules provided by the Parser 320. Early, late, and on-time windows as specified in the O-RAN FH C/U/S-Plane standard may be calculated here and presented to the user via the O-RAN FHA SW 390. In some examples, C/U Timing Analysis may be performed via the Window Estimation hardware packet analyzer 330-A using the timing signal provided by the Counter 360.

As another instance, a user may select a Packet Capture function using the O-RAN FHA SW 390, so that the O-RAN FHA SW 390 may configure the TCAM in the Parser 320 with the appropriate rule (i.e., select the user-identified packets and/or packet flows) and the matching action (i.e., (i) route the selected packet flow to the Packet Capture hardware packet analyzer 330-B; and (ii) direct the Packet Capture hardware packet analyzer 330-B to store the packets and perhaps perform appropriate hardware processing). In such an example, the selected packets/packet flow(s) being routed by the Parser 320 to the Packet Capture hardware packet analyzer 330-B may be accompanied by action bits/field which instructs the Packet Capture hardware packet analyzer 330-B to capture the selected packets/packet flows and store them in, e.g., a Double Data Rate (DDR) buffer. In some examples, the Packet Capture hardware packet analyzer 330-B, following instructions indicated by the action bits/field, may implement a line rate dual port capture by making use of separate (or integrated) DDR components and/or Dual In-line Memory Modules (DIMMs) to store the packets/packet flows based on some criteria. For example, a separate capture buffer may be implemented for each direction, i.e., the UL and the DL, or for each plane, e.g., the C-Plane and the U-Plane; or by matching C-Plane packets to the U-Plane packets they pertain to; or by some other criteria, which criteria may be set by a user, or by the O-RAN FHA SW 390 for higher-level analysis and reporting/monitoring, etc. In some examples, the Packet Capture hardware packet analyzer 330-B may support dual port 100-Gbps line rate capture.

In these examples involving the Packet Capture hardware packet analyzer 330-B, the timestamp put on the individual packets upon entering the O-RAN FHA HW 300 by the MAC receivers 307 may play a crucial role in analysis by, for example, providing a "real-time" check separate from the time(s) already stored in the packet headers by the sender. In some examples, these O-RAN FHA HW 300-generated timestamps may be saved as corresponding metadata for each captured packet. When requested, these timestamps along with the other metadata and, in some examples, the Packet Capture hardware packet analyzer 330-B may provide the captured packets themselves to the O-RAN FHA SW 390 for higher-level analysis and processing. In some examples, the action bits/field may also indicate a trigger threshold for the buffer storage, which may, e.g., inform the O-RAN FHA SW 390 or its user of the event, or automatically purge the buffer and send its contents to the O-RAN FHA SW 390 for higher-level analysis and processing. The timestamped packets from the capture buffer may then be used by the O-RAN FHA SW 390 for, e.g., offline decode functionalities. In some examples, C/U/S/M-Plane packet flows may be captured in Double Data Rate Synchronous Dynamic Random Access Memory (DDR-SDRAM) embedded in the Packet Capture hardware packet analyzer 330-B.

In typical telecommunication link analyzers, such low level timing synchronization and analysis per packet as the Window Estimation and Packet Capture functions described above may be performed mostly via software on one or more captured packets/frames (stored in hardware) of the packet traffic flow on the link (i.e., post-processing of captured traffic packets/frames in storage/memory). By contrast, the O-RAN FHA HW 300 according to examples of the present disclosure provides processing such as, e.g., Window Estimation, C/U Timing Analysis, in real-time by hardware (i.e., real-time-processing of tapped traffic packets/frames from the O-RAN FH link 130).

As indicated by the three dots in between the hardware packet analyzers 330 of FIG. 3, there may be any number of hardware packet analyzers 330 in the O-RAN FHA HW 300, which may perform a wide variety of functions, analyses, and/or measurements, including, but not limited to, other measurements and testing specified in the O-RAN FH C/U/S-Plane standard, the O-RAN FH M-Plane standard, and/or the O-RAN FHA IoT standard. For example, according to examples of the present disclosure, one or more of hardware packet analyzers 330 in the O-RAN FHA HW 300 may perform functions such as, e.g., I/Q Transmission Analysis, M-Plane Analysis, S-Plane Analysis, M-Plane Client Analysis (which may involve measurements and timing analysis of the Network Configuration Protocol (NETCONF)), and the lower-level processing involved in C/U-Plane Physical Resource Block (PRB) Utilization Analysis, some of which are described in greater detail below.

As another instance, a user may select specific packets/packet flows of interest for generating impairments using the O-RAN FHA SW 390, so that the O-RAN FHA SW 390 may configure the TCAM in the Parser 320 with the appropriate rule (i.e., select the user-identified packets and/or packet flows) and the matching action (i.e., (i) route the selected packet flow to the Impairment Generation hardware packet analyzer 330-Z; and (ii) direct the Impairment Generation hardware packet analyzer 330-Z to apply one or more impairments on the received packets, perhaps different impairments depending on other conditions, and forward the impaired packet so that they re-enter the live, real-time packet traffic flow on the O-RAN FH link 130). In such an example, the selected packets/packet flow(s) being routed by the Parser 320 to the Impairment Generation hardware packet analyzer 330-Z may be accompanied by action bits/field which instructs the Impairment Generation hardware packet analyzer 330-Z to delay (i.e., Packet Delay Variation-PDV) or even drop the packet/packet flow entirely.

In some examples, the Impairment Generation hardware packet analyzer 330-Z, following instructions indicated by the action bits/field, may establish a specific delay, delay range/window, or jitter, for the selected packets/flow(s). In some examples, the Impairment Generation hardware packet analyzer 330-Z, following instructions indicated by the action bits/field, may generate header field errors in packets of the selected packets/flow(s). It is considered that, in some examples, the Impairment Generation hardware packet analyzer 330-Z, following instructions indicated by the action bits/field, may generate low level spoofing and/or security hazards in packets of the selected packets/flow(s) in order to test the security of the system. In these examples involving the Impairment Generation hardware packet analyzer 330-Z, the timestamp put on the individual packets upon entering the O-RAN FHA HW 300 by the MAC receivers 307-DU/307-RUs may play a role in, for example, generating the appropriately synchronized and timed impairments, or providing a "real-time" check separate from the time(s) already stored in the packet headers by the sender.

As mentioned above, and in some examples, only the packets/packet flow(s) output from the Impairment Generation hardware packet analyzer 330-Z actually "flows through" the O-RAN FHA HW 300 to re-enter the packet traffic flow on the O-RAN FH link 130, as indicated by the line connecting the output of the Impairment Generation hardware packet analyzer 330-Z to a De-Arbiter 340. The De-Arbiter 340 takes the single stream of packets/flow(s) from the Impairment Generation hardware packet analyzer 330-Z and splits the packets/flow(s) into respective target paths based on, e.g., action bits/field provided by either the Impairment Generation hardware packet analyzer 330-Z or the Parser 320, and/or the original metadata of the packet upon entering the O-RAN FHA HW 300. This information mainly includes port information, indicating whether the packet was received by the O-RAN FHA HW 300 by input 305-DU/MAC receiver 307-DU (i.e., the transmissions on the O-RAN FH link 130 from the O-DU 120) or by input 305-RU/MAC receiver 307-RU (i.e., the transmissions on the O-RAN FH link 130 from the O-RU 140). If the packet was received at input 305-DU/MAC receiver 307-DU, it may be forwarded on to be transmitted to O-RU 140; if the packet was received at input 305-RU/MAC receiver 307-RU, it may be forwarded on to be transmitted to O-DU 120.

More specifically, as shown in FIG. 3, the packet traffic flow intended for O-DU 120 may be sent to a Fixed Delay 350-DU, while the packet traffic flow intended for O-RU 140 may be sent to a Fixed Delay 350-RU. Fixed Delays 350 may compensate for the delay introduced by the individual packets going through the various data paths and circuitry of the O-RAN FHA HW 300. In some examples, the Fixed Delays 350 may assist in ensuring that S-Plane PTP packets and C/U timing packets are not subject to Packet Delay Variation (PDV) or delay asymmetry in either direction. The various circuit paths of differing lengths and complexity through which the various packets may go through, may cause delay, which may vary from build to build of the O-RAN FHA HW 300. Accordingly, in some examples, for each build of the O-RAN FHA HW 300, the worst case delays for each data path may be determined, and the Fixed Delays 350 may be set such that all packets exiting the O-RAN FHA HW 300 may have the same delay, which may be easily compensated for by whichever unit on the O-RAN FH link 130 receives the packets.

The O-DU packet flow traffic exits Fixed Delay 350-DU and may enter MAC transmitter 355-DU, while the O-RU packet flow traffic exits Fixed Delay 350-RU and may enter MAC transmitter 355-RU before exiting the O-RAN FHA HW 300 and re-entering the packet traffic flow on FH link 130 via an output 357-DU and an output 357-RU, respectively. In some examples, the general purpose of the MAC transmitters 355 may be to ensure that frames going back onto the O-RAN FH link 130 may have the proper format to meet the IEEE 802.3 standard (with, e.g., a Frame Check Sequence (FCS)/Cyclic Redundancy Check (CRC), a proper interface gap, Physical Coding Sublayer (PCS)/Physical Layer encoding, etc.). In some examples, the MAC transmitters 355 may receive a timing signal from the Counter 360 which may be used to adjust the PTP correction field in S-Plane packets when the real-time O-RAN FHA 150 may include a PTP boundary clock (i.e., a Telecom Boundary Clock (T-BC) and/or Telecom Transparent Clock (T-TC) function). In some examples, the MAC transmitters 355 may use the timing signal when the real-time O-RAN FHA 150 may be emulating S-Plane impairments.

In some examples, the MAC receivers 307 may be timestamping incoming packets with an accuracy of about 20-30 ns. In some examples, an accuracy of about +/−100 ns may be maintained for the packets flowing thru the real-time O-RAN FHA 150 in intrusive mode with some fixed delay of about 2-15 microseconds depending on the line rate. In some examples, the parsing/processing of received frames may be roughly a few hundred nanoseconds after the first bit/symbol is received at the inputs 305. In some examples, processing in "real-time" may be understood as processing every received frame in real-time O-RAN FHA 150 and performing some real-time operation on each frame (such as, e.g., parsing, defining/identifying a packet flow, and/or counting or performing some other function on a per frame or per frame payload basis).

In various examples of the present disclosure, the packet flows from one, some, or all of the hardware packet analyzers 330 may or may not be forwarded onward in the real-time O-RAN FHA 150, i.e., the packets exiting from one, some, or all of the hardware packet analyzers 330 may or may enter the next three modules, e.g., the De-Arbiter 340, one of Fixed Delays 350-A and 350-B, and one of MAC transmitters 355-DU and 355-RU. In some examples of the real-time O-RAN FHA in the intrusive mode, all packet flows from the hardware packet analyzer(s) 330 (and/or any traffic routed elsewhere by the Parser 320) would continue to the De-Arbiter 340, which separates the incoming packets into appropriate traffic flows for the O-DU 10 and O-RU 20, in a manner complementary and opposite to the combining process performed by the Arbiter 310. In other examples of the intrusive mode, packet flows exiting from only some or one hardware packet analyzer 330 would be forwarded to the De-Arbiter 340 as part of the process of being re-introduced to the traffic flow on the FH link. For instance, in the example shown in FIG. 3, only the packet flow from the Impairment Generation hardware packet analyzer/block 330-Z continues onto the De-Arbiter 340 and other modules to be re-introduced into the traffic flow on the O-RAN FH link.

In some examples, the real-time O-RAN FHA 150 may have a low-latency/non-intrusive mode which may employ circuit paths which run directly from input 305-DU to output 357-RU and directly from input 305-RU to output 357-DU with the same parallel transceiver data and recovered clock. In examples using such a low-latency/non-intrusive mode, the packet flow through the real-time O-RAN FHA 150 bypass most of the interior components, such as, e.g., the Arbiter 310, the Parser 320, the De-Arbiter 340, and the Fixed Delays 350-DU and 350-RU.

In examples like FIG. 3, where less than all of the incoming packet flows may be, after analysis by the O-RAN FHA HW 300, output to rejoin the packet traffic flow on the O-RAN FH link 130, or when in non-intrusive mode, only copies of the O-RAN FH link packet traffic flow may actually enter the real-time O-RAN FHA 150 in real-time. In such examples, a splitter may be used so a replica of the packet traffic flow on the O-RAN FH link 130 enters the real-time O-RAN FHA 150 for analysis in real-time. In examples specifically like FIG. 3, where only the Impairment Generation hardware packet analyzer/block 330-Z generates packet traffic which will re-enter the traffic flow on the O-RAN FH link 130, the real-time O-RAN FHA 150 may route all other packet traffic around the components in the O-RAN FHA HW 300 directly to the exiting modules. In some examples, the O-RAN FHA HW 300 may support a low latency Layer 1 flow-thru mode and/or a low-time-error Layer 2 intrusive mode.

As described in detail above, after all, some, or none of the packet traffic from one or more of the hardware packet analyzers 330 may be separated into two streams by De-Arbiter 340, one containing O-DU traffic and the other containing O-RU traffic, the two streams may be modified by Fixed Delays 350, which may ensure the packets may be synchronized appropriately with the other traffic on the O-RAN FH link 130, transmitted by MAC transmitters 355, and exit through outputs 357 to re-enter the packet traffic flow of the O-RAN FH link 130.

As shown in FIG. 3, O-RAN FHA SW 390 has an HW/SW interface 389 with the O-RAN FHA HW 300 through which the two parts of the real-time O-RAN FHA 150 communicate and exchange control, management, and other forms of data. As mentioned above, HW/SW interface 389 may include a Peripheral Component Interconnect Express (PCIe) Subsystem, but may also include any of a wide variety of communication connections, such as, e.g., a suitable Network Interface Controller or Card (NIC) or any appropriate physical network/device interface, as would be understood by one of ordinary skill in the art. As mentioned above and shown by the arrows in FIG. 3, some of the components in the O-RAN FHA HW 300 which may communicate through HW/SW interface 389 include, but are obviously not limited to, the Flow Tracker 370, which may provide data concerning packet traffic flow; the Parser 320, which may receive control signals representing user commands, instructions, and other parameters from the O-RAN FHA SW 390; and one or more of the hardware packet analyzers 330, which both may receive instructions/data and transmit measurements/notes/low-level hardware analyses to O-RAN FHA SW 390 (which also get control signals—"actions bits"—and instructions from the Parser 320). In addition, at least one of the circuit paths out of the Parser 320 may connect directly to HW/SW interface 389 (as shown by arrow labelled "C/U/S/M") to deliver specific packets and packet traffic flows to O-RAN FHA SW 390 for higher level I/Q and O-RAN analysis, such as, e.g., PTP, Ethernet Synchronization Messaging Channel (ESMC), M-Plane packets, as well as certain C/U-Plane packet flows. In some examples, the O-RAN FHA HW 300 may also include a capture component to capture and hold certain Ethernet frames for further study/analysis by O-RAN FHA SW 390.

Returning to FIG. 3, the O-RAN FHA SW 390 may have a Storage 392, a Capture/Decode block 391, a Service layer 393, a Micro Front End (MFE) layer 395 and a Browser/Graphical User Interface (GUI) 397. Capture/Decode block 391 receives the raw information from the O-RAN FHA HW 300 and forwards individual parts of it to the appropriate service modules in the Service layer 393 and/or onto Storage 392. Storage 392 may store, for example, captured packet traffic flow captured using a packet capture Application Programming Interface (API), such as, e.g., pcap. Capture/Decode block 391 may pass parameters between O-RAN FHA SW 390 and the O-RAN FHA HW 300 via the HW/SW interface 389 using a Remote Procedure Call (RPC) framework, such as, e.g., gRPC. Moreover, gRPC calls may be used to provide information and data, such as metadata of the C/U-Plane frames and/or the C/U-Plane packets/frames themselves, from Capture/Decode block 391 to the services (shown as the boxes) in Service layer 393. MFE layer 395 may include multiple MFE web components (shown as the boxes), which may communicate with the services in Service layer 393 via Representational State Transfer (REST) APIs. The multiple MFE web components in MFE layer 395 may communicate with Browser/GUI 397 to present information, graphics, and other data to a user. By using the data collected from the O-RAN FHA HW 300, the services in the Service layer 393 and the MFEs in the MFE layer 395 provide frontend services to be displayed on Browser/GUI 397, such as, e.g., Flow Explorer, C/U-Plane Timing Analysis, M-Plane Analysis, S-Plane Analysis, and an M-Plane Stack application. In some examples, the O-RAN FHA SW 390 may provide real-time frame insertion/removal functionality for, e.g., intrusive thru M-Plane peering.

Although shown as a single entity in FIG. 3, the O-RAN FHA SW 390 according to examples of the present disclosure may be operationally separable into multiple components. In some examples, the Browser/GUI 397, or higher-level portions of the Browser/GUI 397, may be operated on a remote computer connected by a network to the remaining components of the O-RAN FHA 150. In some examples, portions or all of the Browser/GUI 397 may be implemented as a program on a laptop computer connected to the Internet, where the remaining components of the O-RAN FHA 150 are also connected to the Internet. In such examples, the remaining components of the O-RAN FHA 150 may have an IP address and be accessed remotely by the laptop computer.

The O-RAN FHA SW 390 may be implemented in and/or by any number of processors and non-transitory computer-readable storage media storing instructions executable by the processor(s) which may be separate from the hardware accelerator which may comprise the O-RAN FHA HW 300. The processor(s) implementing the O-RAN FHA SW 390 may include multiple processing units executing instructions in parallel. The non-transitory computer-readable storage medium/media implementing the O-RAN FHA SW 390 may be any memory, such as a hard disk drive, a removable memory, or a solid-state drive (e.g., flash memory or dynamic random access memory (DRAM)). In some examples, one or more processors in the O-RAN FHA SW 390 may perform one or more functions; in some examples, one or more non-transitory computer-readable storage media in the O-RAN FHA SW 390 may store instructions that, when executed by the one or more processors, cause the one or more processors to perform any of the functions described herein. In some examples, functions such as those described herein in reference to the O-RAN FHA SW 390 may be performed by one or more processors wired/wirelessly connected to the O-RAN FHA HW 300.

In some examples, the O-RAN FHA SW 390 may be implemented by a rack server, such as, for example, a Dell™ PowerEdge Rack Server (e.g., a R7515 server), containing one or more processors, such as, for example, an Advanced Micro Devices (AMD™) EPYC 700×/900× series server processor, with from 8 GB to 2 TB of DDR4 Registered DIMM (RDIMM) and/or Load-Reduced DIMM (LRDIMM) having a bandwidth up to 3200 MegaTransfers per second (MT/s), and 100 GB-1 TB Solid State Drive (SSD) memory. As would be understood by one of ordinary skill in the art, this is only one specific configuration of a wide variety of possible configurations suitable for implementing the O-RAN FHA SW 390.

Returning to the O-RAN FHA HW 300 in FIG. 3, it may be observed from the above description that the O-RAN FHA HW 300 according to examples of the present disclosure may include one or more of the following functions:

- Physical layer/QSFP interfaces, supporting dual port 10/25/100G Ethernet monitors and in-line flow-thru mode, with recovered clock for SyncE transparency
- Ethernet MAC layer functions, including Layer 2 Link counters/stats (aggregate per port)
- Packet parsing covering Layer 2 thru 4, and basic eCPRI/O-RAN headers
- Flow discovery/tracking in hardware with per connection statistics (flow types include all valid C/U/S/M frames)—which may be used for Explorer style GUI in the O-RAN FHA SW 390
- Flexible flow filtering to direct specific flows to analysis blocks in hardware (with possible software-controlled parameters for the filtering in the O-RAN FHA SW 390)
- Analysis blocks may include:
  - Hardware C/U Timing/Window Analysis (on downlink and uplink U-plane/C-plane frames)
  - Hardware Packet Capture, supporting dual port 100G line rate capture.
  - Real-time software analysis (by the O-RAN FHA SW 390 receiving data via HW/SW interface 389)
  - Hardware O-RAN Fronthaul PTP and ESMC frames
- O-RAN standard and I/Q Tx/Rx analysis
- Timestamp counter with nanosecond resolution and possible inputs from external timing modules.
- Frame insertion/removal (including, e.g., real-time software frame insertion/removal by the O-RAN FHA SW 390 for intrusive thru M-plane peering).
- Support for low latency flow-thru mode (Layer 1) and low-time-error intrusive mode (Layer 2)
- O-RAN Impairment block(s)

Figure 4A:
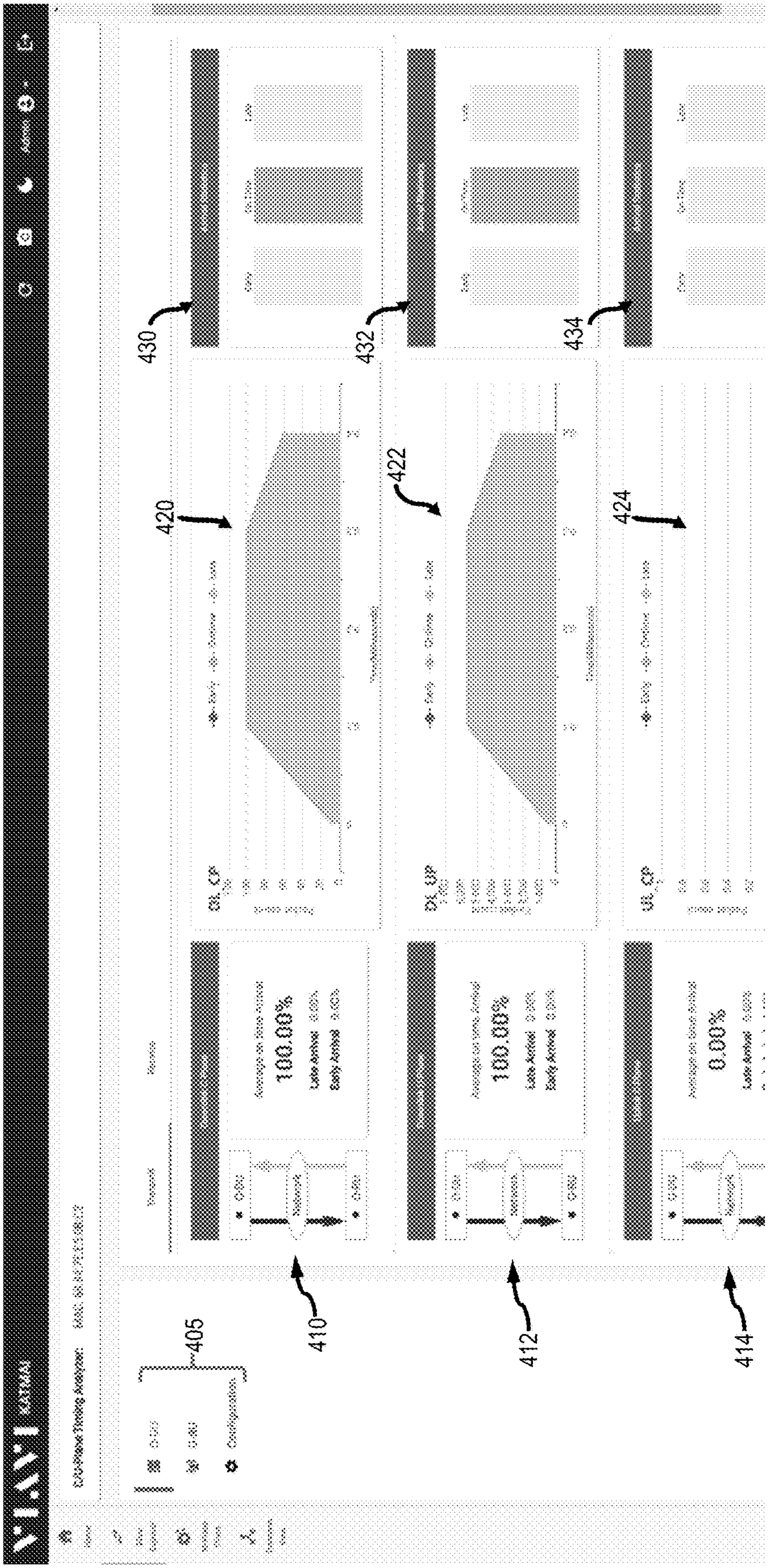
FIGS. 4A, 4B, and 4C are screenshots of displays on the Browser/GUI of services provided by a real-time O-RAN FHA, according to examples.
Figure 4B:
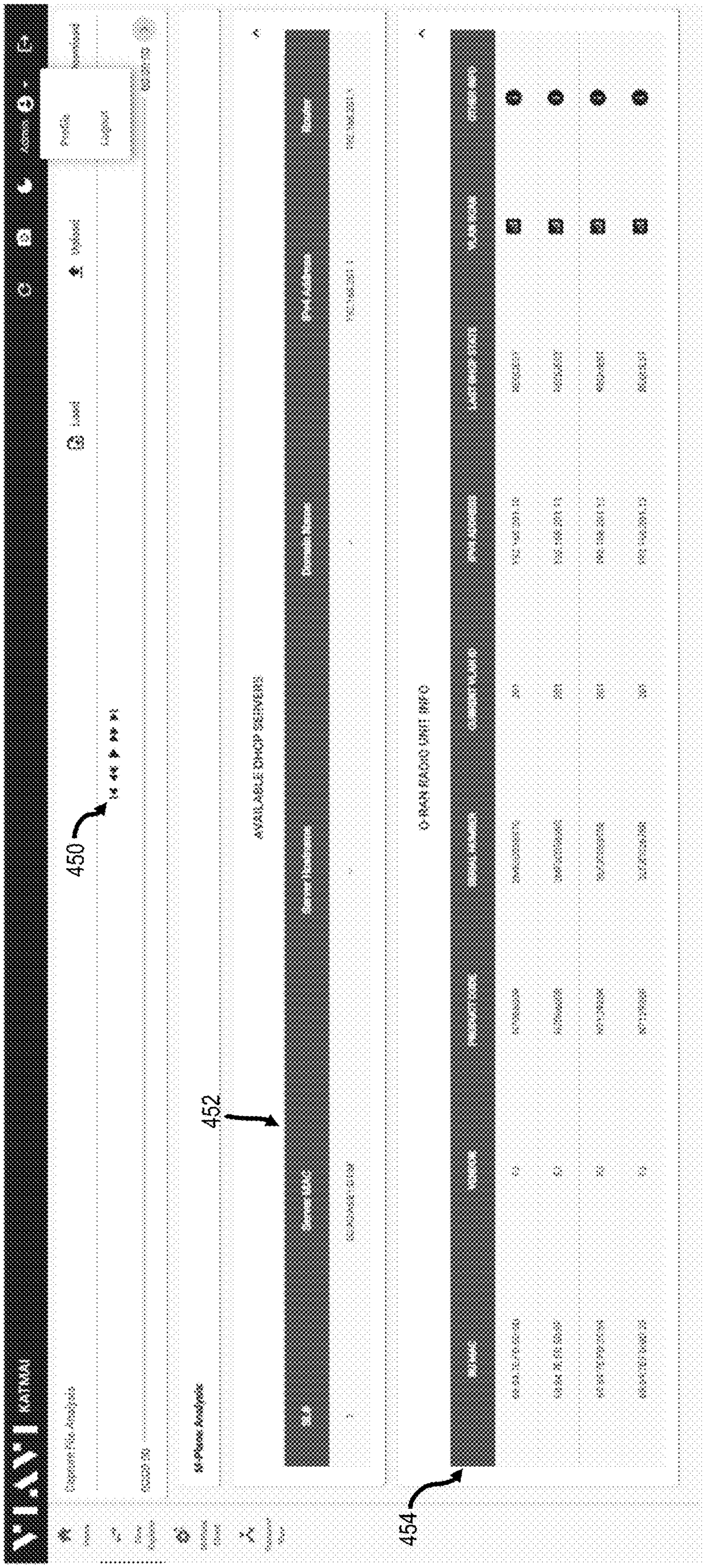
Figure 4C:
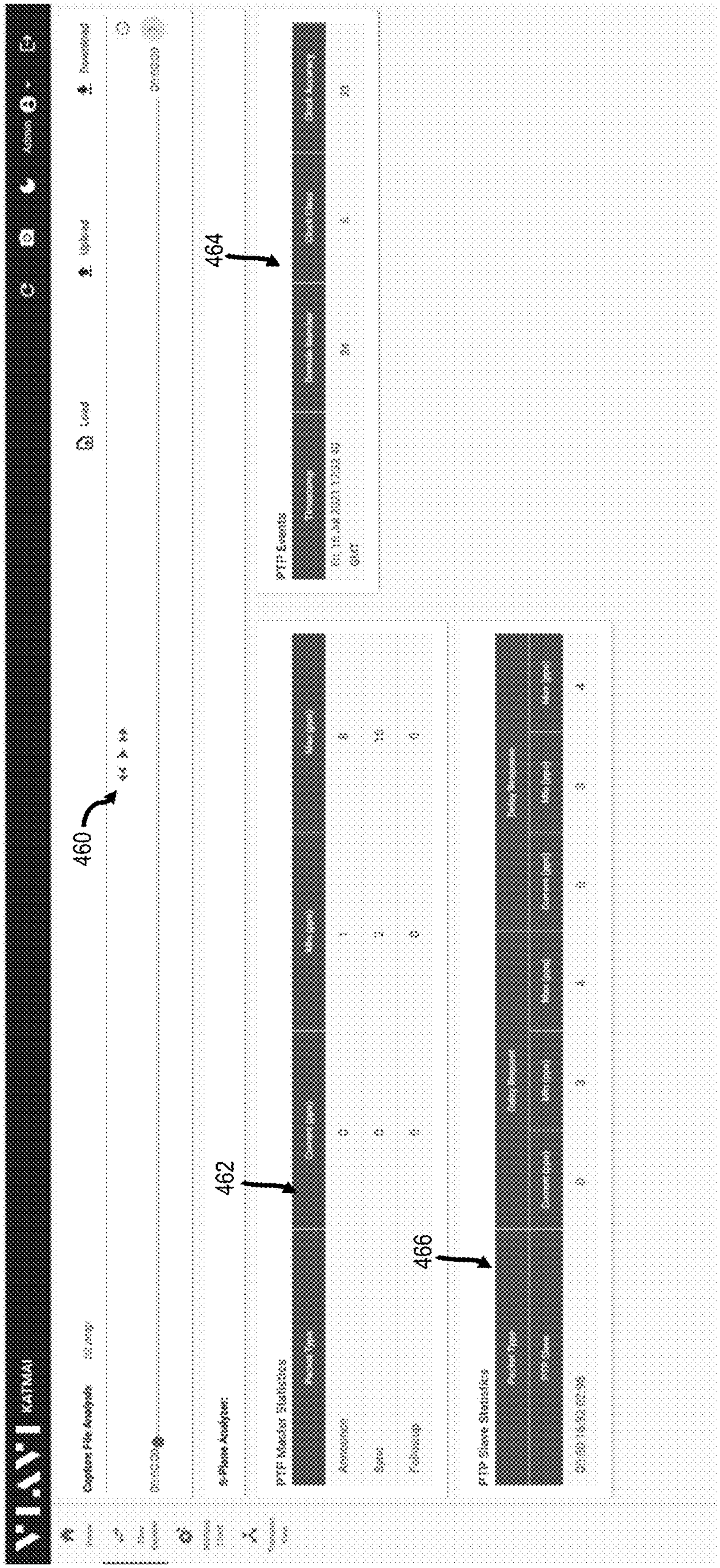

FIGS. 4A, 4B, and 4C are screenshots of displays on Browser/GUI 397 of services provided by the real-time O-RAN FHA 150, according to examples. More specifically FIG. 4A illustrates an example of a C/U-Plane Timing Analyzer service; FIG. 4B illustrates an example of an M-Plane Analysis service; and FIG. 4C illustrates an example of a S-Plane Analysis service.

In the example of a C/U-Plane Timing Analyzer service shown in FIG. 4A, three different display screens 405 may be selected: an O-DU screen showing O-DU statistics and tracking information, an O-RU screen showing O-RU statistics and tracking information, and a Configuration screen for selecting the parameters of the C/U-Plane Timing Analysis. As shown in FIG. 4A, the O-DU screen is selected. In the O-DU screen of the C/U-Plane Timing Analyzer service shown in FIG. 4A, block 410 shows the average percentage of C-Plane downlink (DL) packets having an on-time arrival time; block 420 is a graph breaking down the number of early, late, and on-time C-Plane DL packets; and block 430 is a bar graph showing the early, on-time, and late statistics of the C-Plane DL packets. Similarly, block 412 shows the average percentage of U-Plane DL packets having an on-time arrival time; block 422 is a graph breaking down the number of early, late, and on-time U-Plane DL packets; and block 432 is a bar graph showing the early, on-time, and late statistics of the U-Plane DL packets. Lastly, block 414 shows the average percentage of C-Plane uplink (UL) packets having an on-time arrival time; block 424 is a graph breaking down the number of early, late, and on-time C-Plane UL packets; and block 434 is a bar graph showing the early, on-time, and late statistics of the C-Plane UL packets.

In the example of an M-Plane Analysis service shown in FIG. 4B, block 450 may show the reverse/play/fast forward controls for playing a pcap file of a capture file of M-Plane packet traffic flow. Beneath the controls of block 450, block 452 may show information concerning the available Dynamic Host Configuration (DHCP) servers, specifically, each DHCP server's MAC address, Server Hostname, Domain Name, IPv4 address, and Router. Block 454 may show information concerning the O-RAN RUs connected to the O-DU, including each O-RU's Ethernet MAC address, Vendor (manufacturer), Product Code, Serial Number, Current VLAN ID, IPV4 address, Last DHCP State, a link/button to VLAN Scan information, and a link to other information. In other examples, an M-Plane Analysis service may show real-time data/information concerning M-Plane packet flow traffic on the O-RAN FH link 130, instead of (or in addition to) after-the-fact/post-processing data/analysis/information from, e.g., a pcap file.

In the example of a S-Plane Analysis service shown in FIG. 4C, block 460 may show the reverse/play/fast forward controls for playing a pcap file of a capture file of S-Plane packet traffic flow. Beneath the controls of block 460, block 462 may show statistics concerning the PTP Master, specifically, for each PTP Master packet type, the current packet flow (in packets per second (pps)), the minimum packet flow, and the maximum packet flow. Block 464 may show information concerning any PTP events, such as the timestamp, Domain Number, Clock Class, and Clock Accuracy of the PTP event. Block 466 may show statistics concerning any PTP Slaves, specifically, for each PTP Slave, its MAC address, delay request statistics (current, minimum, and maximum flow), and delay response statistics (current, minimum, and maximum flow). In other examples, an S-Plane Analysis service may show real-time data/information concerning S-Plane packet flow traffic on the O-RAN FH link 130, instead of (or in addition to) after-the-fact/post-processing data/analysis/information from, e.g., a pcap file.

Using a C/U-Plane Timing Analyzer service such as shown in FIG. 4A, an M-Plane Analysis service such as shown in FIG. 4B, and/or a S-Plane Analysis service such as shown in FIG. 4C, a user may analyze and determine whether the C/U Plane packet traffic flow, the M-Plane packet traffic flow, and/or the S-Plane packet traffic flow of the O-RAN FH link 130 is within the specifications of the O-RAN standard. Thus, for example, when connecting an O-DU 120 of one vendor to an O-RU 140 of another vendor over the O-RAN FH link 130, a user of a real-time O-RAN FHA 150 according to examples of the present disclosure may determine if O-DU 120 and O-RU 140 may be interoperable according to the specifications of the O-RAN standard.

Figure 5:
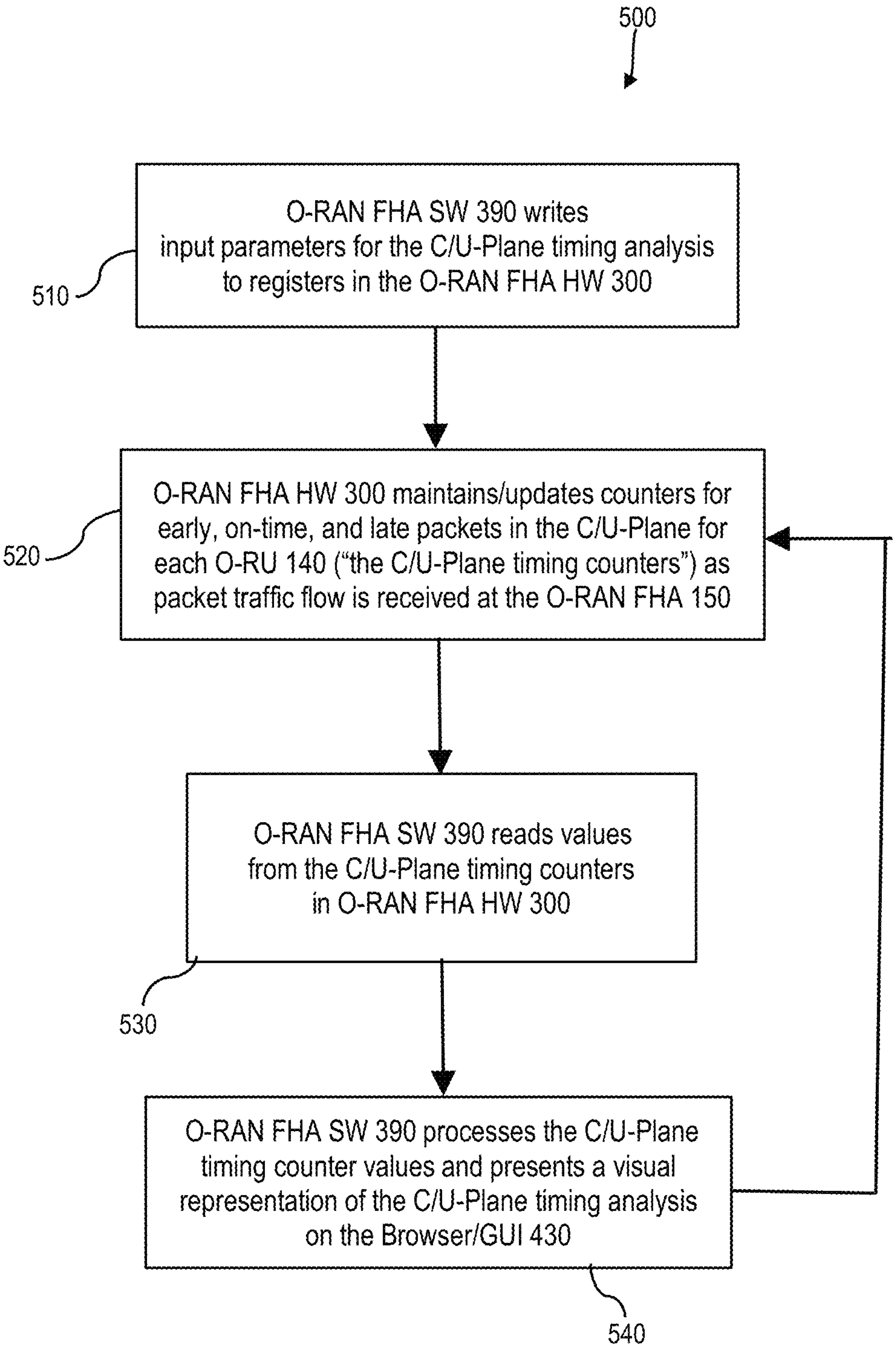
FIG. 5 is a flowchart of a method for analyzing C-Plane and U-Plane packet flow traffic on an O-RAN FH link by a real-time O-RAN FHA/GUI, according to an example.

FIG. 5 illustrates a flowchart of a method for performing C/U-Plane timing analysis on the O-RAN FH link 130 with the O-RAN FHA 150 according to an example. A method 500 shown in FIG. 5 is provided by way of example and may only be one part of an entire process, as would be understood by one of ordinary skill in the art. The method 500 may further omit parts of any process, procedure, ongoing operation, method, etc., involved in the O-RAN FH link 130 analysis not germane to examples of the present disclosure, as would be understood by one of ordinary skill in the art. Each block shown in FIG. 5 may further represent one or more steps, processes, methods, or subroutines, as would be understood by one of ordinary skill in the art. In some examples, the processes in the blocks of FIG. 5 may overlap and/or may occur substantially simultaneously. For the sake of convenience and ease of explanation, the blocks in FIG. 5 may refer to the components shown in the other figures described herein; however, the method 500 is not limited in any way to the components, apparatuses, and/or constructions described and/or shown in any of the other figures herein.

At block 510, the O-RAN FHA SW 390 may write input parameters for the C/U-Plane timing analysis to registers in the O-RAN FHA HW 300. In some examples, the O-RAN FHA SW 390 may provide input parameters to the Parser 320, such as, e.g., control information for selecting and routing C/U-Plane packets to the Window Estimation hardware packet analyzer 330-A. In some examples, the O-RAN FHA SW 390 may provide input parameters to the Window Estimation hardware packet analyzer 330-A, such as, e.g., control information for establishing and maintaining counters concerning the timing, resource allocation, etc., of individual packet flows in the C/U-Plane. In some examples, the O-RAN FHA SW 390 may provide input parameters to the Flow Tracker 370, such as, e.g., control information for establishing and maintaining counters concerning the timing, resource allocation, etc., of individual packet flows in the C/U-Plane.

At block 520, the O-RAN FHA HW 300 may maintain/update counters for early, on-time, and late packets in the C/U-Plane on both the uplink and the downlink for each O-RU 140 ("the C/U-Plane timing counters") as packet traffic flow is being received at the real-time O-RAN FHA/GUI 150. In some examples, the C/U-Plane timing counters may be maintained/implemented at the Flow Tracker 370, the Window Estimation hardware packet analyzer 330-A, and/or elsewhere on the O-RAN FHA HW 300.

At block 530, the O-RAN FHA SW 390 may read values from the C/U-Plane timing counters in O-RAN FHA HW 300. In some examples, a C/U-Plane Timing Analysis Service may send a gRPC through the Capture/Decode 391 and the HW/SW interface 389 to retrieve such values from the C/U-Plane timing counters which may be maintained/implemented at the Flow Tracker 370, the Window Estimation hardware packet analyzer 330-A, and/or elsewhere on the O-RAN FHA HW 300. In some examples, block 530 may be performed periodically or continuously while block 520 is being performed.

At block 540, the O-RAN FHA SW 390 may perform higher-level processing on the values from the C/U-Plane timing counters in O-RAN FHA HW 300 and may present a visual representation of the C/U-Plane timing analysis on the Browser/GUI 397 of the real-time O-RAN FHA 150. In some examples, the Browser/GUI 397 may use REST API to query, access, and/or generate appropriate data for a visual presentation from the C/U-Plane Timing Analysis MFE and the C/U-Plane Timing Analysis Service. In some examples, block 540 may be performed periodically or continuously while blocks 520 and 530 are being performed.

As indicated above and by the arrow from block 540 back to block 520 in FIG. 5, blocks 520, 530, and 540 may be continuously performed roughly/approximately simultaneously. In some examples, blocks 520 and 530 may be continuously performed roughly/approximately simultaneously in real-time by components in the O-RAN FHA HW 300, while the O-RAN FHA SW 390 continuously performs block 540 roughly/approximately in near-real-time, using data generated by the O-RAN FHA HW 300 in blocks 520 and 530. Accordingly, a user of the real-time O-RAN FHA 150 according to examples of the present disclosure may use the visual representation of the C/U-Plane packet flows from block 540 of FIG. 5 to validate operability/interoperability of the O-RAN FH link 130. As discussed above, in some examples, the visual representation may include, for each packet flow, its eAxC Id, bandwidth, and packet counts, such that, for example, the visual representation may help the user validate the operability/interoperability of the O-RAN FH link 130, its O-DUs 120, and its O-RUs 140. In such examples, the visual representation may help the user determine if the O-RAN FH link 130 may support a sufficient number of flows for user equipment to communicate with the O-DUs 120 (and thereby connect to the core network).

In some examples, the interface 155 of the real-time O-RAN FHA 150 may be placed/connected at various locations on the O-RAN FH link 130 to perform particular analyses, measurements, etc. In such examples, the location of the O-RAN FHA interface 155 may be one of the input parameters for determining the analytical timing measurements. Other input parameters, which may be entered by a user and/or automatically determined by the real-time O-RAN FHA 150 itself, may also include, for example, the MAC addresses of the O-RUs 140 (which may be, e.g., Ethernet MAC addresses), the total and/or per-flow bandwidth, the SubCarrier Spacing (SCS) value/numerology, the a (alpha) and β (beta) offsets (see, e.g., Sect. 11.7 and Table 11.7.2-1 of the O-RAN FH C/U/S-Plane standard), the timing parameters listed in Tables 1 and 2, etc., as would be understood by one of ordinary skill in the art.

In an example where the O-RAN FHA interface 155 is connected at the O-DU 120 end of the O-RAN FH link 130 (i.e., similarly located as R1 and R4 in FIG. 2B), the real-time O-RAN FHA 150 may observe C/U-Plane packet transmission windows, parameters, and tolerances, as listed in Table 3:

TABLE 3

O-RAN FHA/GUI C/U-Plane Timing Analysis Parameters

| Parameter | Value/Limit |
|---|---|
| C-Plane UL TX Window | T1a_max_cp_ul -- T1a_min_cp_ul |
| C-Plane DL TX Window | T1a_max_cp_dl -- T1a_min_cp_dl |
| U-Plane DL TX Window | T1a_max_up -- T1a_min_up |
| Boundary of Start of C-Plane UL TX Window | T1a_min_cp_ul ≥ (T2a_min_cp_ul + T12_max) |
| Boundaries of Start of C-Plane DL TX Window | T1a_max_cp_dl ≤ (T2a_max_cp_dl + T12_min)<br>T1a_max_cp_dl ≥ (T1a_max_up + Tcp_adv_dl) |
| Boundaries of End of C-Plane DL TX Window | T1a_min_cp_dl ≥ (T2a_min_cp_dl + T12_max)<br>T1a_min_cp_dl = (T1a_min_up + Tcp_adv_dl) |
| Boundary of Start of U-Plane DL TX Window | T1a_max_up ≤ (T2a_max_up + T12_min) |
| Boundary of Start of U-Plane DL TX Window | T1a_min_up ≥ (T2a_min_up + T12_max) |

In an example where the O-RAN FHA interface 155 is connected at the O-RU 140 end of the O-RAN FH link 130 (i.e., similarly placed as R2 and R3 in FIG. 2B), the real-time O-RAN FHA/GUI 150 may observe C/U-Plane packet transmission windows, parameters, and tolerances, as listed in Table 4:

TABLE 4

O-RAN FHA/GUI C/U-Plane Timing Analysis Parameters

| Parameter | Value/Limit |
|---|---|
| C-Plane DL RX Window | T2a_max_cp_dl - T2a_min_cp_dl |
| U-Plane DL RX Window | T2a_max_up - T2a_min_up |
| C-Plane UL TX Window | Ta3_max - Ta3_min |
| Boundary of Start of C-Plane DL RX Window | T2a_max_cp_dl ≥ (T2a_max_up + Tcp_adv_dl) |
| Boundary of End of C-Plane DL RX Window | T2a_min_cp_dl = (T2a_min_up + Tcp_adv_dl) |

Figure 6:
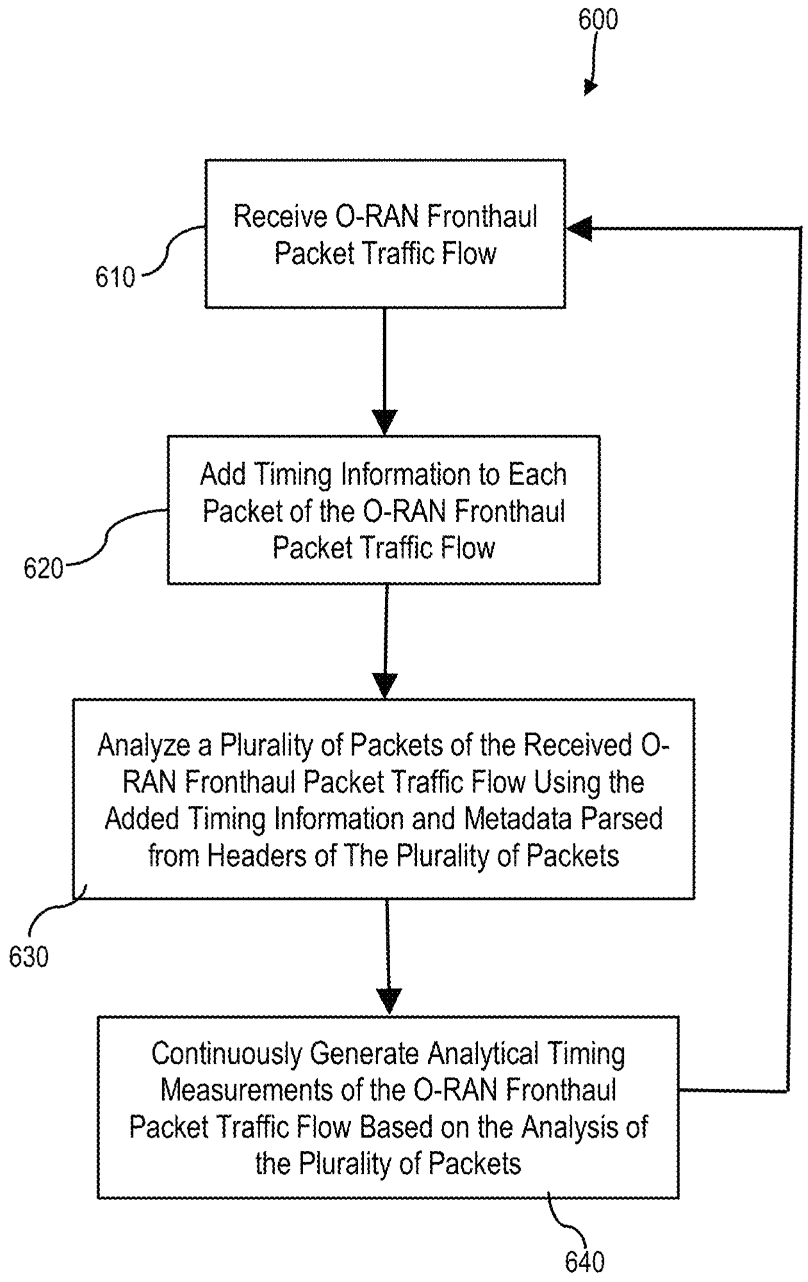
FIG. 6 illustrates a flowchart of a method for analyzing packet flow traffic on an O-RAN FH link using a hardware accelerator according to an example.

FIG. 6 illustrates a flowchart of a method for analyzing packet flow traffic on an O-RAN FH link 130 using a hardware accelerator according to an example. A method 600 shown in FIG. 6 is provided by way of example and may only be one part of an entire process, as would be understood by one of ordinary skill in the art. The method 600 may further omit parts of any process, procedure, ongoing operation, method, etc., involved in O-RAN FH link 130 analysis not germane to examples of the present disclosure, as would be understood by one of ordinary skill in the art. Each block shown in FIG. 6 may further represent one or more steps, processes, methods, or subroutines, as would be understood by one of ordinary skill in the art. In some examples, the processes in the blocks of FIG. 6 may overlap and/or may occur substantially simultaneously. For the sake of convenience and ease of explanation, the blocks in FIG. 6 may refer to the components shown in the other figures described herein; however, the method 600 is not limited in any way to the components, apparatuses, and/or constructions described and/or shown in any of the other figures herein.

At block 610, a hardware accelerator of a real-time O-RAN FHA 150 according to an example of the present disclosure may receive the packet traffic flow of a O-RAN FH link 130. In some examples, the O-RAN FHA HW 300 of the real-time O-RAN FHA 150 may receive the packet flow traffic from O-DU 120 via the input 305-DU while the packet flow traffic from O-RU 140 may be received via the input 305-RU.

At block 620, the hardware accelerator of the real-time O-RAN FHA 150 may add timing information to each packet of the received packet traffic flow of the O-RAN FH link 130. In some examples, the MAC receiver 307-DU and the MAC receiver 307-RU timestamp all of the packets in the O-DU 120 packet flow and the O-RU 140 packet flow, respectively, using the timing clock signal from the Counter 360.

At block 630, the hardware accelerator of the real-time O-RAN FHA 150 may parse metadata from a header of each packet in the received packet traffic flow of the O-RAN FH link 130. In some examples, the timestamped packets from the MAC receiver 307-DU and the MAC receiver 307-RU may first be combined into a single stream by the Arbiter 310 and then the Parser 320 may parse metadata from the packets in the single stream and send that metadata to the Flow Tracker 370, which tracks the various flows on the O-RAN FH link 130 in real-time. The Parser 320 may also route the parsed packets to various components on the O-RAN FHA HW 300, including the Counter 360, the hardware packet analyzers 330 (such as, e.g., the Window Estimation hardware packet analyzer 330-A), and the HW/SW interface 389 (for further processing by the O-RAN FHA SW 390).

At block 640, the hardware accelerator of the real-time O-RAN FHA 150 may analyze a plurality of packets in the received packet traffic flow of the O-RAN FH link 130 using at least one of the added timing information and/or the parsed metadata of the plurality of packets. In some examples, any one of the Flow Tracker 370, the Counter 360, the hardware packet analyzers 330, and/or another component on the O-RAN FHA HW 300 may perform the analysis.

At block 650, the hardware accelerator of the real-time O-RAN FHA 150 may continuously generate analytical timing measurements of the O-RAN FH link 130 based on the analysis of the plurality of packets from block 640. In some examples, any one of the Flow Tracker 370, the Counter 360, and the hardware packet analyzers 330 may be both performing the analysis and generating the analytical timing measurements continuously in real-time. As indicated by the arrow from block 650 back to block 610 of FIG. 6, this process of receiving O-RAN FH link 130 packet traffic flow, adding timing information, parsing metadata, analyzing using the added timing information and parsed metadata, and generating analytical timing measurements may be occurring continuously and may also be performed in parallel by any two or more of the Flow Tracker 370, the Counter 360, and the one or more hardware packet analyzers 330. By contrast, any analysis using only capture/snapshot technology may not be able to generate analytical timing measurements continuously and/or in real-time.

In some examples, the real-time O-RAN FHA 150 ensures substantially all packets which flow through the real-time O-RAN FHA 150 may experience a similar fixed delay, which may be implemented by Fixed Delays 350, in order to minimize time error for both the intrusive and non-intrusive modes. In some examples, the real-time O-RAN FHA 150 may provide bidirectional SyncE clock recovery, which may avoid any break/interrupt of the SyncE line frequency from, e.g., the O-DU 120 to the O-RU 140 (in network configuration LLS-C1), which may be beneficial when in either intrusive mode. In such examples, the real-time O-RAN FHA 150 may provide SyncE clock transparency in each direction ("bidirectional SyncE clock transparency"), i.e., a recovered clock from inputs 305 to a transmit clock of outputs 357 and vice-versa, which may be beneficial for both the non-intrusive and intrusive modes.

While specific circuit configurations such as the arrangements of a number of components are shown in conjunction with the figures herein, the illustrated configurations are not intended to be limiting. A real-time O-RAN FHA 150 in accordance with examples of the present disclosure may be implemented with other configurations and component values using the principles described herein. Moreover, while examples described herein are directed to configurations as shown, it should be appreciated that any of the components described or mentioned herein may be altered, changed, replaced, or modified, in size, shape, and numbers, or material, depending on application or use case, and adjusted for desired analysis or optimal measurement results.

It should be appreciated that the apparatuses, systems, and methods described herein may minimize and/or reduce the timing for performing O-RAN FH link 130 analysis, and thereby facilitate the construction of more reliable and accurate O-RAN FH links 130, specifically by ensuring the interoperability of different components manufactured by different vendors.

It should also be appreciated that the apparatuses, systems, and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the O-RAN FH link 130, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Generally speaking, any one or more of the components and/or functionalities described in reference to any of the figures herein may be implemented by hardware, software, and/or any combination thereof, as described in the above examples of the present disclosure. In some examples, the components and/or functionalities may be implemented by at least one of any type of application, program, library, script, task, service, process, or any type or form of executable instructions executed on hardware such as circuitry that may include digital and/or analog elements (e.g., one or more transistors, logic gates, registers, memory devices, resistive elements, conductive elements, capacitive elements, and/or the like, as would be understood by one of ordinary skill in the art). In some examples, the hardware and data processing components used to implement the various processes, operations, logic, and circuitry described in connection with the examples described herein may be implemented with a general purpose single- and/or multichip processor, a single- and/or multi-core processor, a digital signal processor (DSP), an application specific integrated circuit (ASIC), a field programmable gate array (FPGA), or other programmable logic device, discrete gate or transistor logic, discrete hardware components, and/or any combination thereof suitable to perform the functions described herein. A general purpose processor may be any conventional processor, microprocessor, controller, microcontroller, and/or state machine. In some examples, the memory/storage may include one or more components (e.g., random access memory (RAM), read-only memory (ROM), flash or solid state memory, hard disk storage, etc.) for storing data and/or computer-executable instructions for completing and/or facilitating the processing and storage functions described herein. In some examples, the memory/storage may be volatile and/or non-volatile memory, and may include database components, object code components, script components, or any other type of information structure suitable for implementing the various activities and storage functions described herein.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A real-time Open Radio Access Network (O-RAN) fronthaul analyzer, comprising:
- a hardware accelerator to receive and analyze packets of an O-RAN Distributed Unit (O-DU) fronthaul packet traffic flow and an O-RAN Radio Unit (O-RU) fronthaul packet traffic flow, comprising:
  - a counter to maintain a clock using an external source, wherein the packets of the O-DU fronthaul packet traffic flow and the O-RU fronthaul packet traffic flow are timestamped based on the counter;
  - a parser to parse and route the timestamped packets into different circuit paths based on a routing criteria; and
  - one or more hardware packet analyzers, wherein each of the one or more hardware packet analyzers receives a plurality of the parsed and routed packets and generates analytical timing measurements in real-time using the timestamps of the plurality of the parsed and routed packets,
- wherein the parser is further to parse and route Control Plane (C-Plane) and User Plane (U-Plane) packets (C/U-Plane packets) from the O-DU fronthaul packet traffic flow and O-RU fronthaul packet traffic flow to a window estimation hardware packet analyzer of the one or more hardware packet analyzers, and
- wherein the window estimation hardware packet analyzer is to monitor timing parameters of the C/U-Plane packets and to calculate early, late, and on-time transmission or reception windows of the C/U-Plane packets in real-time.

2. The real-time O-RAN fronthaul analyzer of claim 1, wherein the routing criteria is set by a user.

3. The real-time O-RAN fronthaul analyzer of claim 1, wherein the routing criteria is based on a communication plane of the packets.

4. The real-time O-RAN fronthaul analyzer of claim 1, wherein the hardware accelerator comprises a Field Programmable Gate Array (FPGA).

5. The real-time O-RAN fronthaul analyzer of claim 4, wherein the hardware accelerator further comprises at least one of a Double Data Rate (DDR) memory, a clock, and a Phase-Locked Loop (PLLs).

6. The real-time O-RAN fronthaul analyzer of claim 1, wherein the hardware accelerator further comprises:
- a Medium Access Controller (MAC) receiver to timestamp the packets of the O-DU fronthaul packet traffic flow and the O-RU fronthaul packet traffic flow based on the counter.

7. The real-time O-RAN fronthaul analyzer of claim 1, wherein the counter is to maintain the clock using at least one of an external time reference or incoming Precision Timing Protocol (PTP) packets of a Synchronization Plane (S-Plane) of the O-DU fronthaul packet traffic flow and the O-RU fronthaul packet traffic flow.

8. The real-time O-RAN fronthaul analyzer of claim 7, wherein the counter comprises:
- an embedded core processor to parse the incoming PTP packets of the S-Plane of the O-DU fronthaul packet traffic flow and synchronize the clock.

9. The real-time O-RAN fronthaul analyzer of claim 1, wherein the counter is to select a primary timing signal among a plurality of timing signals to maintain the clock.

10. The real-time O-RAN fronthaul analyzer of claim 1, wherein the parser is further to parse metadata from header fields of the timestamped packets, and wherein the hardware accelerator further comprises:
- a flow tracker to receive the metadata from the parser and to track individual flows within the O-DU fronthaul packet traffic flow and O-RU fronthaul packet traffic flow in real-time.

11. The real-time O-RAN fronthaul analyzer of claim 1, wherein the packets of the O-DU fronthaul packet traffic flow and the O-RU fronthaul packet traffic flow through the hardware accelerator, wherein the packets experience a similar fixed delay for a non-intrusive mode or an intrusive mode.

12. The real-time O-RAN fronthaul analyzer of claim 11, wherein the hardware accelerator further comprises:

an input to receive the packets of the O-DU fronthaul packet traffic flow and the O-RU fronthaul packet traffic flow from an O-RAN fronthaul (FH) link; and an output to transmit the packets that flow through the hardware accelerator back into the O-RAN FH link, wherein the hardware accelerator is further to provide bidirectional Synchronous Ethernet (SyncE) clock transparency between the input and output.

13. The real-time O-RAN fronthaul analyzer of claim 1, wherein the hardware accelerator taps the O-DU fronthaul packet traffic flow and O-RU fronthaul packet traffic flow.

14. The real-time O-RAN fronthaul analyzer of claim 1, further comprising:

one or more processors and one or more non-transitory computer-readable storage media storing instructions executable by the one or more processors, wherein the one or more processors are to receive data from the hardware accelerator and to perform higher-level processing and to generate a graphical user interface (GUI) to display results of the higher-level processing and the analytical timing measurements of the one or more hardware packet analyzers of the hardware accelerator.

15. A hardware accelerator for real-time analysis of an Open Radio Access Network (O-RAN) fronthaul link, comprising:

a counter to maintain a clock;

one or more Medium Access Controller (MAC) receivers to receive and timestamp packets of an O-RAN Distributed Unit (O-DU) fronthaul packet traffic flow and an O-RAN Radio Unit (O-RU) fronthaul packet traffic flow on the O-RAN fronthaul link, wherein the received packets are timestamped based on the counter;

an arbiter to combine the timestamped packets of the O-RAN Distributed Unit (O-DU) fronthaul packet traffic flow and the O-RAN Radio Unit (O-RU) fronthaul packet traffic flow into a single stream of packets;

a parser to receive the single stream of packets, parse the packets of the single stream of packets, and to route the parsed packets into different circuit paths based on a routing criteria; and a Control Plane and User Plane (C/U-Plane) timing hardware packet analyzer to receive C/U-Plane packets routed by the parser from the single stream of packets and to generate C/U-Plane analytical timing measurements in real-time using timestamps of the C/U-Plane packets.

16. The hardware accelerator of claim 15, wherein the hardware accelerator comprises a Field Programmable Gate Array (FPGA).

17. The hardware accelerator of claim 15, wherein the parser is further to parse metadata from header fields of the packets of the single stream of packets, and wherein the hardware accelerator further comprises:

a flow tracker to receive the metadata from the parser and to track individual flows within the O-DU fronthaul packet traffic flow and O-RU fronthaul packet traffic flow in real-time.

18. The hardware accelerator of claim 15, wherein the counter is to maintain the clock by generating a primary timing signal from at least one of an external reference timing signal or incoming Precision Timing Protocol (PTP) packets of a Synchronization Plane (S-Plane) of the O-DU fronthaul packet traffic flow and the O-RU fronthaul packet traffic.

19. A method of real-time analysis of an Open Radio Access Network (O-RAN) fronthaul link, the method comprising:

receiving, by a Field Programmable Gate Array (FPGA), an Open Radio Access Network (O-RAN) fronthaul link packet traffic flow between an O-RAN Distributed Unit (O-DU) and an O-RAN Radio Unit (O-RU);

adding, by the FPGA, timing information to each packet in the received O-RAN fronthaul link packet traffic flow;

parsing, by the FPGA, metadata from a header of each packet in the received O-RAN fronthaul link packet traffic flow, the parsing comprising:

parsing Control Plane (C-Plane) and User Plane (U-Plane) packets (C/U-Plane packets) from the O-DU fronthaul packet traffic flow and O-RU fronthaul packet traffic flow;

routing the C/U-Plane packets to a window estimation hardware packet analyzer in the FPGA;

analyzing, by the FPGA, a plurality of packets in the received O-RAN fronthaul link packet traffic flow using at least one of the added timing information or the parsed metadata of the plurality of packets, the analyzing comprising:

monitoring timing parameters of the C/U-Plane packets; and calculating early, late, and on-time transmission or reception windows of the C/U-Plane packets in real-time; and continuously generating, by the FPGA, analytical timing measurements of the O-RAN fronthaul link based on the analyzing of the plurality of packets.

* * * * *